US005446237A

United States Patent [19]

Abe et al.

[11] Patent Number: 5,446,237

[45] Date of Patent: Aug. 29, 1995

[54] ELECTRONIC MUSICAL INSTRUMENT HAVING A CONTROL SECTION MEMORY FOR GENERATING MUSICAL TONE PARAMETERS

[75] Inventors: Yasunao Abe; Satoshi Miyata; Shinichi Ito, all of Hamamatsu, Japan

[73] Assignee: Yamaha Corporation, Japan

[21] Appl. No.: 871

[22] Filed: Jan. 5, 1993

[30] Foreign Application Priority Data

Jan. 8, 1992 [JP] Japan .................................. 4-001787
Jan. 8, 1992 [JP] Japan .................................. 4-001788

[51] Int. Cl.[6] ........................... G10H 7/00; H04J 3/00
[52] U.S. Cl. .......................................... 84/617; 84/602
[58] Field of Search .................................. 84/602–604, 84/617, 626

[56] References Cited

U.S. PATENT DOCUMENTS

| | | | |
|---|---|---|---|
| 4,703,680 | 11/1987 | Wachi et al. . | |
| 5,159,144 | 10/1992 | Fujisawa et al. | 84/656 |
| 5,248,842 | 9/1993 | Saito | 84/602 |
| 5,283,387 | 2/1994 | Tanaka | 84/608 |
| 5,286,910 | 2/1994 | Hasebe | 84/609 |
| 5,308,916 | 5/1994 | Murata et al. | 84/603 |
| 5,317,947 | 6/1994 | Miyata | 84/615 |

*Primary Examiner*—William M. Shoop, Jr.
*Assistant Examiner*—Jeffrey W. Donels
*Attorney, Agent, or Firm*—Graham & James

[57] ABSTRACT

An electronic musical instrument having a common memory, a tone generator and a control section. The common memory stores a plurality of musical tone parameters and is accessed by the tone generator and the control section. The tone generator generates a musical tone based on the musical tone parameters stored in the common memory and writes a musical tone parameter indicating the current state of the musical tone being generated by the tone generator, in the common memory. The control section directs the tone generator to generate a musical tone by writing the plurality of musical tone parameters corresponding to the musical tone in the common memory and controls the tone generation by monitoring the current state of the musical tone based on the musical tone parameter stored in the common memory. In the electronic musical instrument, the load of the control section for controlling the tone generator is reduced, and the circuit sizes of the control section and the total memory capacity required for the electronic musical instrument are also reduced.

12 Claims, 15 Drawing Sheets

600:ENVELOPE GENERATOR

ELECTRONIC MUSICAL INSTRUMENT HAVING A CONTROL SECTION MEMORY FOR GENERATING MUSICAL TONE PARAMETERS

BACKGROUND OF THE INVENTION

The present invention relates to electronic musical instruments which employ storage means such as a memory and generate musical tones through the access of the storage means.

Conventional electronic musical instruments have performance data input means such as a keyboard; control means which generates control parameters such as a command for triggering the musical tone generation in response to the input data inputted through the performance data input means; and a tone generator which generates musical tones based on the control parameters. Generally, the tone generator provides registers for storing musical tone parameters such as a current amplitude value of the musical tone waveform and a state of the envelope waveform of the generated musical tone. In the tone generator, calculation operations are sequentially executed based on these stored musical tone parameters and the musical tone parameters are sequentially updated based on the calculated result. Through these operations, the tone generation of the musical tone waveform designated by the control means is carried out. Furthermore, in general electronic musical instrument, a RAM (Random Access Memory) is provided as a storage means for storing the control parameters mentioned above and is used by the control means.

Meanwhile, there are cases in which the control means observes the state of the musical tone generation by the tone generator and controls the operation of the tone generator based on the observation. For example, such a case appears in the electronic musical instruments which have a plurality of sound channels and are capable of generating a plurality of musical tones simultaneously and independently by using the sound channels. In these electronic musical instruments, when a new key-on event is detected from the keyboard, the control means selects one of the sound channels through which the musical tone having the lowest envelope value is generated and assigns the selected sound channel for generating the musical tone corresponding to the new key-on event. In such a case, the control means of the conventional electronic musical instrument should read out the musical tone parameters which indicate the state of the musical tone generation and are stored in the control registers of the tone generator. Such an access operation is very heavy load for the control means and therefore it is difficult to provide a high-performance electronic musical instrument. Furthermore, in the case where the number of the sound channels of the tone generator is large, a large number of registers should be provided in the tone generator for storing the musical tone parameters and a large scale control circuit should be provided for controlling the access of the registers. Therefore, the electronic musical instrument becomes high cost.

Furthermore, there are cases in which the same musical tones are repeatedly generated to obtain a sound having a special effects such as a echo sound. In these case, the control means should generate the musical tone parameters every time each one of the musical tones is generated by the tone generator although there are few difference between the musical tone parameters to be generated and the musical tone parameters which have been previously generated.

SUMMARY OF THE INVENTION

In consideration of the above, it is an object of the present invention to provide an electronic musical instrument having a high cost performance ratio in which the load of the control circuit for controlling the tone generator is reduced and the sizes of the control circuit and the memory for storing the control parameters is also reduced.

In an aspect of the present Invention, there is provided an electronic musical instrument comprising a common memory for storing a plurality of musical tone parameters; a tone generator for generating a musical tone based on the musical tone parameters stored in the common memory and writing a musical tone parameter in the common memory, which indicates the current state of the musical tone being generated by the tone generator; and a control section for directing the tone generator to generate a musical tone by writing the musical tone parameters corresponding to the musical tone in the common memory and controling the tone generation of the tone generator by monitoring the current state of the musical tone based on the musical tone parameter stored in the common memory.

In the aspect of the present invention, there is further provided an electronic musical instrument comprising a first memory for storing a plurality of musical tone parameters; a second memory means for storing a control program to thereby control the electronic musical instrument; a control processor for reading out the control program from the second memory means, controlling the electronic musical instrument based on the read out control program and being capable of performing the reading or writing operation of the musical tone parameters to the first memory in synchronization with a first time slot; a reading circuit for reading out the musical tone parameters during a second time slot, the timing of which is different from that of said first time slot; and a tone generater for generating a musical tone based on the musical tone parameters read out from the first memory by the reading means.

In the aspect of the present invention, there is further provided an electronic musical instrument comprising a common memory having a plurality of memory areas each of which stores musical tone parameters corresponding to a musical tone to be generated; a tone generator having a plurality of tone generation channels, respectively corresponding to the plurality of memory areas, each of which generates a musical tone based on the musical tone parameters stored in the corresponding memory area, each of the plurality of tone generation channels writing the current state of a musical tone being generated thereby as a musical tone paremeter in the corresponding memory areas; and a control section for monitoring the current states of the musical tones generated by the plurality of tone generating channels based on the musical tone parameters stored in the memory areas of the common memory, the control means, in response to a tone generation designation, selecting one of the plurality of tone generation channels based on the current states and writing a musical tone parameter corresponding to the tone generation designation in a memory area corresponding to the selected tone generation channel so as to generate a desired musical tone.

In the aspect of the present invention, there is further provided an electronic musical instrument comprising a common memory having a plurality of memory areas each of which stores musical tone parameters; a tone generator having a plurality of tone generation channels each of which generates a musical tone based on the musical tone parameters stored in the memory areas corresponding thereto; and a control section for selecting on of the plurality of tone generation channels in response to a tone generation designation and for writing the musical tone parameters, which correspond to a musical tone to be generated, in one of the plurality of memory areas corresponding to the selected tone generation channel, and the control section, when same musical tone as a musical tone generated by a tone generation channel is repeatedly to be generated, operating the following processing steps:

(a) reading out the musical tone parameters of the musical tone which has been generated; and (b) writing the read-out musical tone parameters in another of the plurality of memory areas to generate the same musical tone again.

Further objects and advantages of the present invention will be understood from the following description of the preferred embodiments with reference to the drawing.

DETAILED DESCRIPTION OF THE PREFERRED EMBODIMENTS

Configuration of the Preferred Embodiment (1) Overall configuration

Figure 1:
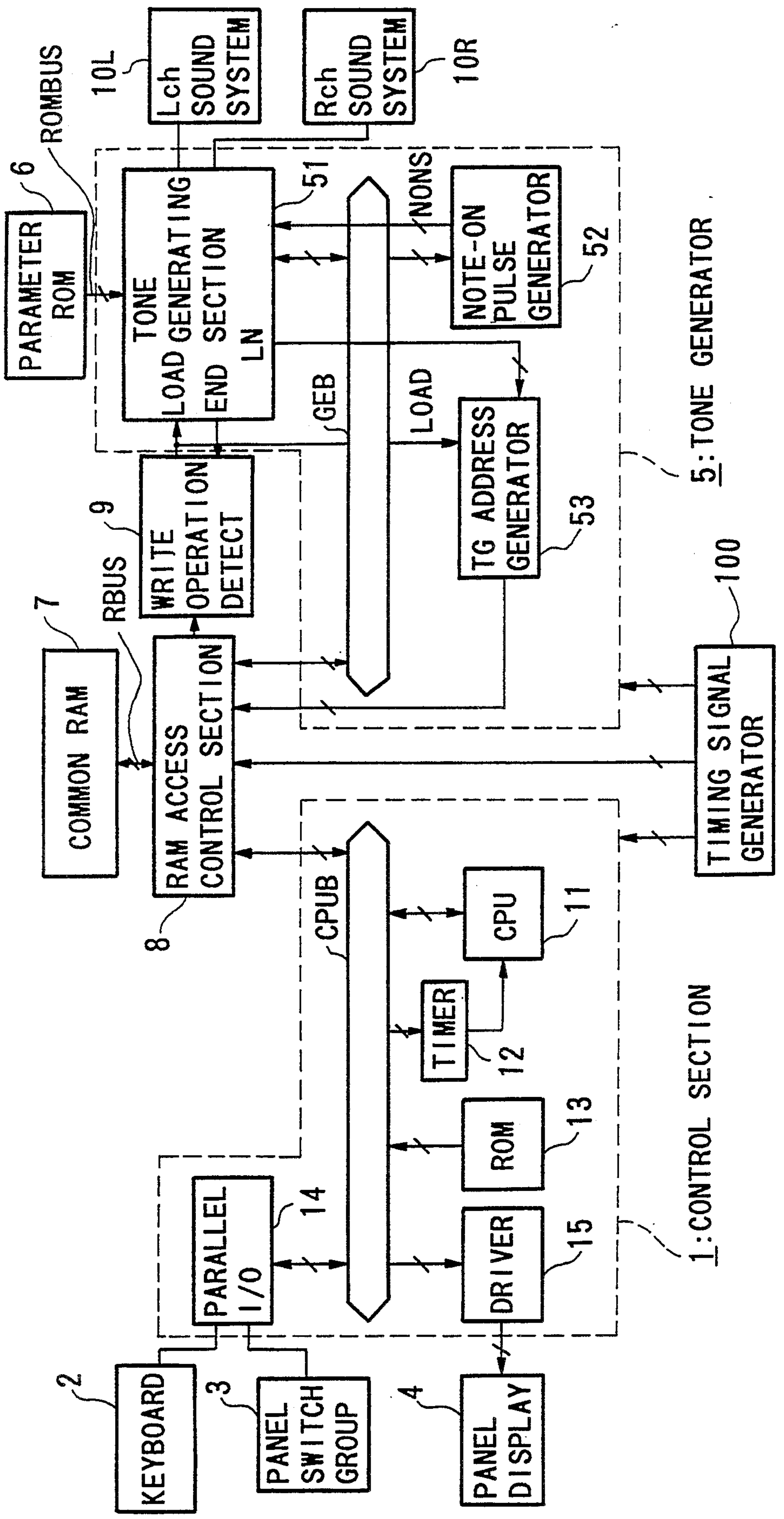
FIG. 1 is a block diagram showing the configuration of an electronic musical instrument of a preferred embodiment of the present invention.
Figure 2:
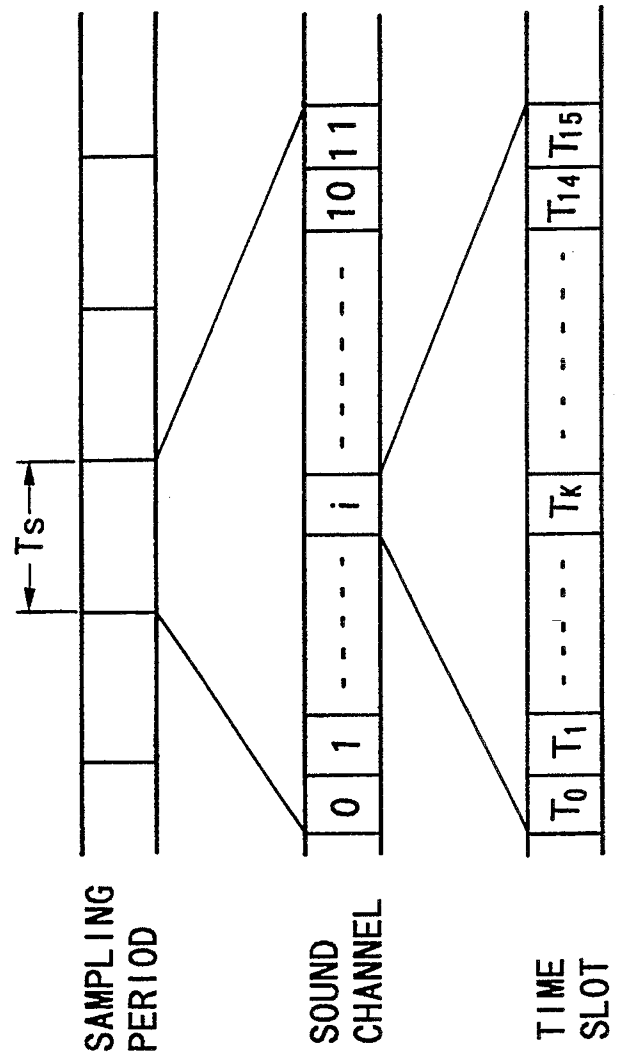
FIG. 2 is a time chart showing the relationship between sampling periods, sound channels and time slots defined in the electronic musical instrument shown in FIG. 1.

FIG. 1 is a block diagram showing the configuration of an electronic musical instrument of a preferred embodiment of the present invention. In FIG. 1, 1 designates a control section which controls the other elements in the electronic musical instrument. 2 designates a keyboard on which a plurality of keys are provided. 3 designates a panel switch group which consists of a plurality of switches, the on/off states of which are changed by the operation of the corresponding operational members provided on the control panel of the electronic musical instrument. 4 designates a panel display which is provided on the control panel for displaying information such as a name of the function which is currently activated. 5 designates a tone generator which generates musical tone signals in response to the note-on command which triggers the tone generation. The tone generator 5 is a time-division-controlled tone generator which can simultaneously generates twelve kinds of musical tones. Waveform data of each musical tone are sequentially generated in synchronization with a sampling clock having a predetermined sampling period Ts and the calculations for determining the waveform are achieved in a time-division-controlled manner by using one of sound channels CHi (i=0 to 11) which are obtained by dividing a sampling period Ts by twelve. Furthermore, one sound channel is divided into sixteen time slots Tk (k=0 to 15). The calculations for determining one waveform data are carried out by using these sixteen time slots. FIG. 2 shows the relationship between the sampling period Ts and the sound channels CHi (i=0 to 11) and the time slots Tk (k=0 to 15). In FIG. 1, 6 designates a parameter ROM (Read Only Memory) which stores musical tone parameters which are used for generating musical tones. The detail description for the musical tone parameter will be given later. The parameter ROM 6 is connected to the tone generator 5 via a ROM bus ROMBUS which consists of an address bus ABROM and a data bus DBROM.

7 designates a common RAM which is used as a storage means for storing the control data which are used by a CPU 11 of the control section 1 to control the operation of the electronic musical instrument and is also used as a storage means for storing the musical tone parameters which are used by the tone generator 5 to generate musical tone signal. The musical tone parameters stored in the common RAM 7 contain data used for the CPU 11 and the tone generator 5 independently and also contain the following data:

A. The data which are given to the tone generator 5 by the CPU 11 such as a note-on command and tone color designation data.

B. The data which indicate the current state of the musical tone generation of tone generator 5 and are monitored by the CPU 11 to control the operation of the electronic musical instrument.

Thus, that is to say, the common RAM 7 acts not only a storage means but also a bi-directional information transfer means through which the bi-directional communication between CPU 11 and tone generator 5 is carried out. The detail description for the data stored in the common RAM 7 will be given later. The common RAM 7 is accessed via a RAM bus RBUS which consists of a data bus $DB_R$, an address bus $AB_R$ and a read/-write line $R/W_R$. The data bus $DB_R$, address bus $AB_R$ and read/write line $R/W_R$ are respectively connected to the data input terminals, address input terminals and read/write input terminal of the common RAM 7.

8 designates a RAM access control section which switches the connection configuration between the CPU 11 of the control section 1, the tone generator 5 and the common RAM 7. 9 designates a write operation detecting section which observes the data writing operation to the common RAM 7. When the first parameter of the musical tone parameter corresponding to the musical tone to be generated (in this embodiment, the first parameter is lower-bit data of voice number VnL) is written in the common RAM 7, the write operation detecting section 9 outputs "1" signal as a load signal LOAD which commands to the tone generator 5 the reading of the parameter corresponding to the musical tone to be generated. 10L and 10R respectively designates left and right channels sound systems which output left and right channels musical tone signals LOUT and ROUT, which are generated by tone generator 5, as musical sounds. 100 designates a timing signal generator which generates timing signals for determining the execution timing of the operations which are to be carried out by the control section 1, the RAM access control section 8 and the tone generator 5.

(2) Configuration of control section 1

The control section i consists of the CPU 11, a timer 12, a ROM 13, a parallel I/O (Input/Output) interface 14, a driver 15 and the above-mentioned CPU bus CPUB which connects the elements 11 to 15 together. In the control section 1, the CPU 11 controls the other elements of the electronic instrument based on the control programs stored in the ROM 13. The timer 12 is provided as a time count means. A time count data is set in this timer by the CPU 11 via the CPU bus CPUB. The timer 12 outputs a timer interrupt signal to the CPU 11 when a time corresponding to the time count data lapses. The states of the keys of the keyboard 2 and the on/off states of the switches of the panel switch group 3 are sensed by the CPU 11 via the parallel I/O interface 14 and via the CPU bus CPUB. The CPU 11 outputs the data used for the musical tone generation such as a note-on command, a tone color designation data to CPU bus CPUB based on the data sensed via the parallel I/O interface 14. Furthermore, the CPU 11 outputs display data which indicate information such as a name of the currently activated function to the driver 15 to display the information on the panel display 4.

(3) Memory map of parameter ROM 6

Figure 3:
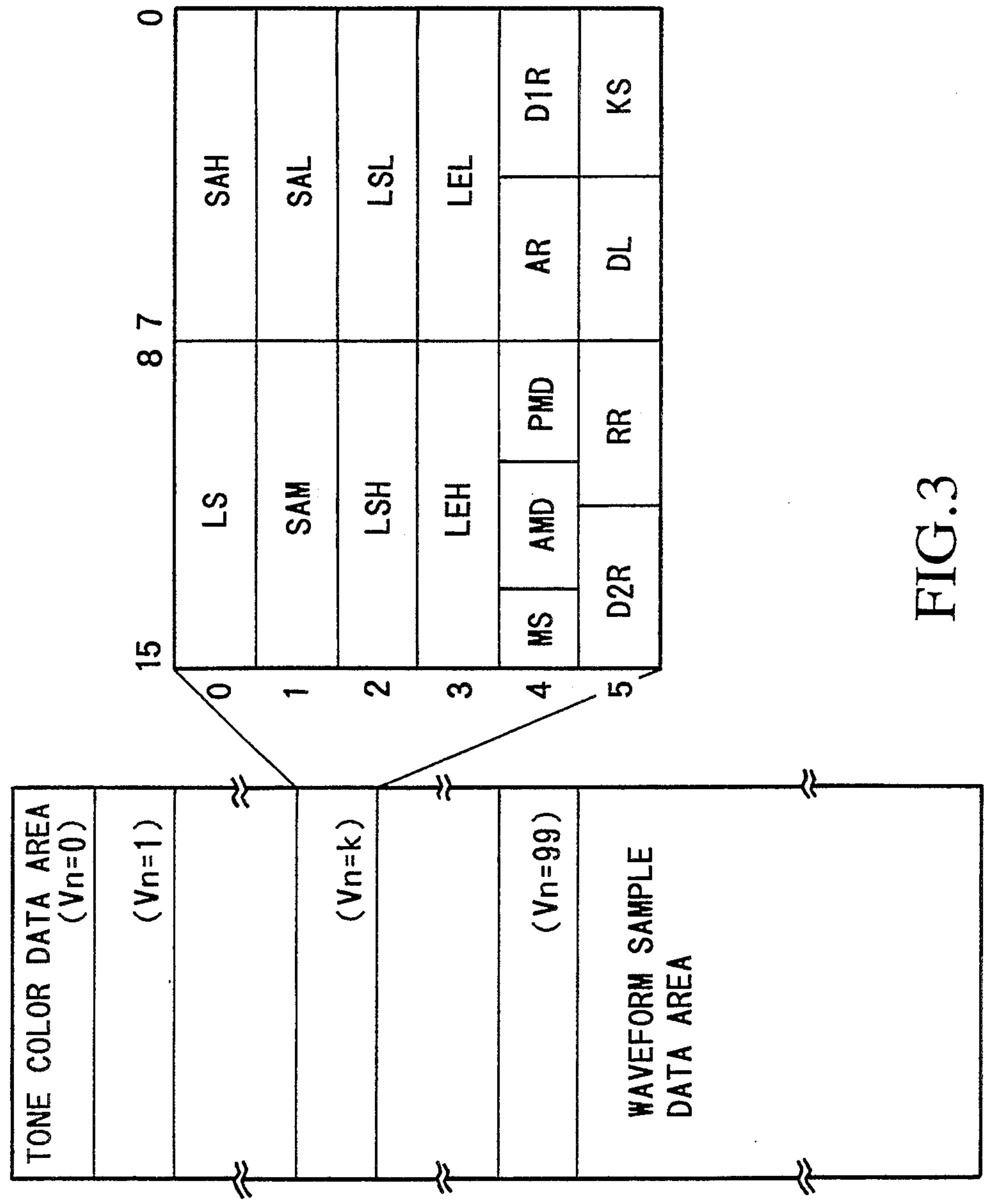
FIG. 3 is a memory map showing the content of a parameter ROM 6 of the electronic musical instrument showin in FIG. 1.

FIG. 3 is a memory map showing the data stored in the parameter ROM 6. The parameter ROM has a plurality of storage areas, each one of which has a storage capacity of 16 bits. In these storage areas, the one hundred continuous storage areas corresponding to the absolute addresses [0] to [99] are tone color data areas in which tone color data corresponding to one hundred kinds of tone colors are stored. These tone color data areas are followed by waveform sample data areas in which the sample data of the waveforms corresponding to the tone colors are stored.

Figure 4:
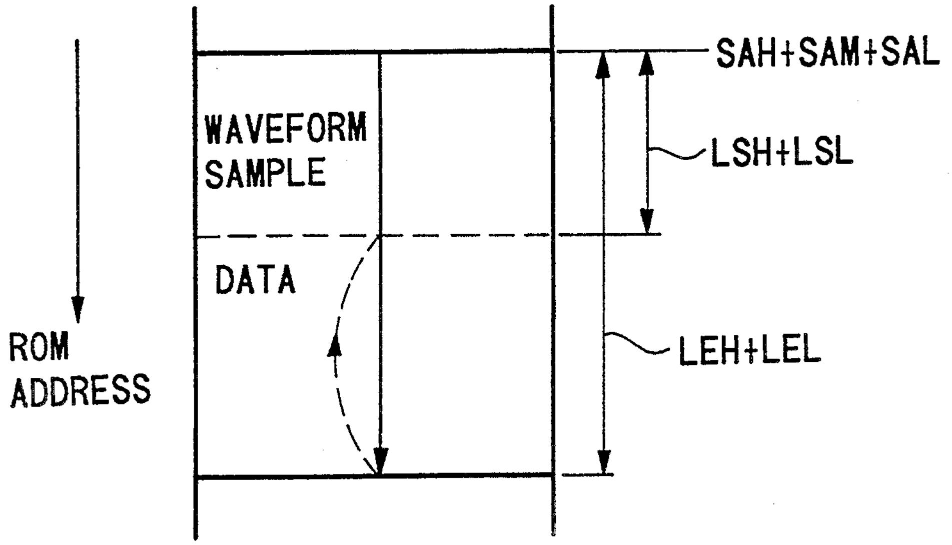
FIG. 4 shows a loop-regeneration control which is performed in the electronic musical instrument shown in FIG. 1.

Each one of the tone color data areas consists of six storage areas which are assigned the relational addresses [0] to [5]. The content of the tone color data stored in these six storage areas are as follows:

In the upper 8 bit area of the storage area corresponding to the relational address [0], a level shift data LS is stored. In the lower 8 bit area of the storage area corresponding to the relational address [0], the upper 8 bit of a start address SAH is stored. In the upper 8 bit area of the storage area corresponding to the relational address [1], the middle 8 bit of the start address SAM is stored. In the lower 8 bit area of the storage area corresponding to the relational address [1], the lower 8 bit of the start address SAL is stored. These data SAH, SAM and SAL constitute a 24 bit start address which is the absolute address of the storage area in which the leading sample data of the waveform of the corresponding tone color is stored. In the upper 8 bit area of the storage area corresponding to the relational address [2], the upper 8 bit of a loop start address LSH is stored and in the lower 8 bit area, the lower 8 bit of the loop start address LSL is stored. These data LSH and LSL constitute a 16 bit loop start address LS which designates the starting point of the loop regeneration part of the waveform sampling data which are to be repeatedly regenerated are stored. The loop start address LS is defined as the relational address with respect to the start address SA=SAH+SAM+SAL. In the upper 8 bit area of the storage area corresponding to the relational address [3], the upper 8 bit of a loop end address LEH is stored and in the lower 8 bit area, the lower 8 bit of the loop end address LEL is stored. These data LEH and LEL constitute a 16 bit loop end address LE which designates the trailing point of the loop regeneration part. The loop end address LE is defined as the relational address with respect to the start address SA. FIG. 4 shows the relationship between start address SA, loop start address LS and loop end address LE. When a note-on command is given to generate a musical tone having a tone color, the sample data of the storage area, the absolute address of which is designated by the start address SA corresponding to the tone color, is read out at first, after which the sampling data of the following storage are sequentially read out. After the sample data is read out from the storage area, the relational address of which is designated by the loop end address LE corresponding to the tone color, the sample data of the loop regeneration part are repeatedly read out from the storage areas, the relational address of the starting point of which is LS and the relational address of the ending point of which is LE.

Figure 5:
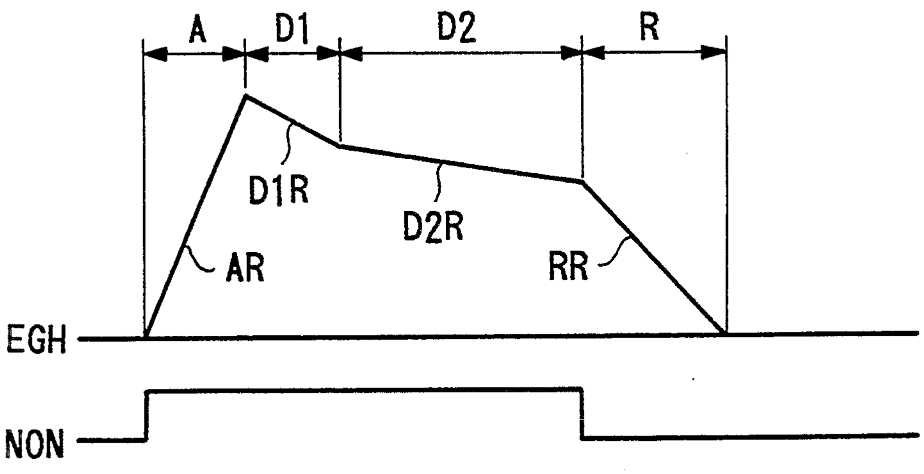
FIG. 5 shows an example of a envelope waveform generated in the electronic musical instrument shown in FIG. 1.

In the upper 8 bit area of the storage area corresponding to the relational address [4], modulation control data MS, AMD and PMD are stored. In the lower 8 bit area of the storage area corresponding to the relational address [4] and in the upper 12 bit area of the storage area corresponding to the relational address [5], the data for controlling the envelope of the musical tone having the corresponding tone color. More specifically, in the lower 4 bit area of the storage area corresponding to the relational address [4], attack rate AR which determines the variation in time of the attack part of the envelope of the musical tone to be generated and the first decay rate D1R which determines the variation in time of the first decay part D1 of the envelope are stored. Next, in the upper 12 bit area of the storage area corresponding to the relational address [5], the second decay ratio D2R which determines the variation in time of the second decay part D2 of the envelope of the musical tone to be generated and release rate RR which determines the variation in time of the release part R of the envelope and reference level DL which designates the level of the envelope at which the part of the envelope is changed from the first decay part to the second decay part (see FIG. 5). Next, in the lower 4 bit area of the storage area corresponding to the relational address [5], key-scaling coefficient KS is stored.

(4) Memory map of common RAM 7

Figure 6:
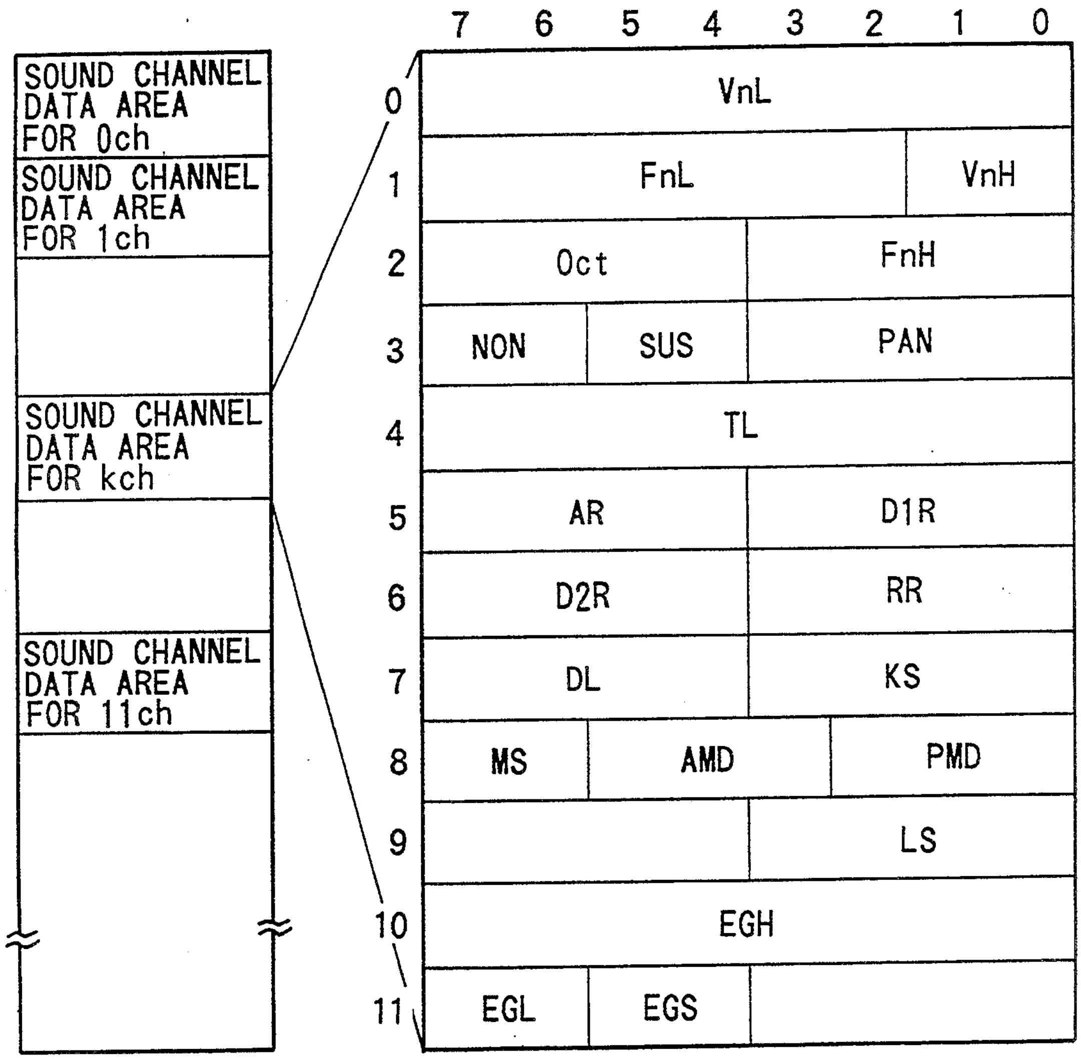
FIG. 6 is a memory map showing the content of a common RAM 7 of the electronic musical instrument shown in FIG. 1.

FIG. 6 is a memory map showing the musical tone parameter storage areas provided in common RAM 7. Common RAM 7 consists of a plurality of storage areas, each one of which has a storage capacity of 8 bit. In these storage areas, a continuous storage areas, the leading storage area of which has the absolute address of [0], are sound channel data areas for storing musical tone parameters corresponding to the sound channels CHi (i=0 to 11). The sound channel data areas are followed by work areas consists of a series of storage areas in which control data used by CPU 11 are stored.

Each one of the sound channel data areas consists of twelve storage areas to which the relational addresses [0] to [11] are assigned. The description for these twelve storage areas will be given as follows:

The storage area corresponding to the relational address [0] is used for storing the lower 8 bit data VnL of the voice number VnL which designates the tone color of the musical tone to be generated at the corresponding sound channel. Next, in the storage area corresponding to the relational address [1], the upper 6 bit area is used for storing the lower 6 bit data FnL of F number Fn which designates the tone pitch of the musical tone to be generated at the corresponding sound channel and the lower 2 bit area is used for storing the upper 2 bit data VnH of the voice number Vn. Next, in the storage area corresponding to the relational address [2], the upper 4 bit area is used for storing octave data Oct which designates the octave of the musical tone to be generated and the lower 4 bit area is used for storing the upper 4 bit data FnH of the F number. Next, in the storage area corresponding to the relational address [3], the upper 2 bit area is used for storing note-on flag NON which triggers the musical tone generation and the middle 2 bit area is used for storing sustain data SUS which designates the actuated amount of the sustain pedal (the illustration is omitted) and the remaining lower 4 bit area is used for storing sound image position data PAN.

The above-described data VnL, FnL, VnH, Oct, FnH, NON, SUS and PAN are generated by CPU 11 and are thereby written in the corresponding storage areas. More specifically, when a key of keyboard 1 is depressed, data VnL, FnL, VnH, Oct, FnH, SUS and PAN are determined by CPU 11 based on the key-on event of the depressed key and the status of the operational members such as tone color designating switches (the illustration is omitted), and the sound channel to be assigned for the tone generation of the musical tone corresponding to the key-on event is determined, and after which the above determined data are written in the sound channel data area corresponding to the sound channel thus determined. Furthermore, data "1" is written in the sound channel data area as note-on flag NON. When the key previously depressed is released, the sound channel which is assigned for generating the musical tone corresponding to the released key is searched by CPU 11, after which data "0" is written as note-on flag NON in the sound channel data area corresponding to the sound channel thus searched.

Next, the storage area corresponding to the relational address [4] is used for storing total level data TL. Next, in the storage area corresponding to the relational address [5], the upper 4 bit area is used for storing attack rate AR and the lower 4 bit area is used for storing the first decay rate D1R. Next, in the storage area corresponding to the relational address [5], the upper 4 bit area is used for storing attack rate AR and the lower 4 bit area is used for storing the first decay rate D1R. Next, in the storage area corresponding to the relational address [6], the upper 4 bit area is used for storing the second decay rate D2R and the lower 4 bit area is used for storing release rate RR. Next, in the storage area corresponding to the relational address [7], the upper 4 bit area is used for storing reference level DL and the lower 4 bit area is used for storing key-scaling coefficient KS. Next, the storage area corresponding to the relational address [8] is used for storing modulation control data MS, AMD and PMD. Next, in the storage area corresponding to the relational address [9], the upper 4 bit area is not used and the lower 4 bit area is used for storing shift data LS.

The above-described data TL, AR, D1R, D2R, RR, DL, KS, MS, AMD, PMD and LS are generated by tone generator 5 and are thereby written in the corresponding storage areas. Thus, when a key-on event is detected and voice number Vn of the musical tone to be generated is then written by CPU 11 in one of the sound channel data area, the tone color data TL, AR, D1R, D2R, RR, DL, KS, MS, AMD, PMD and LS which correspond to the voice number are read out from parameter ROM 6 by tone generator 5, after which the read out tone color data are written in the above sound channel data area. When the key-off event corresponding to the above key-on event is detected and data "0" is written as note-on flag NON in the above sound channel data area, release rate RR having a large value is written in the above sound channel data area by tone generator 5.

Next, the storage area corresponding to the relational address [10] is used for storing the upper 8 bit data EGH of current envelope data EGD. Next, in the storage area corresponding to the relational address [11], the upper 2 bit area is used for storing the lower 2 bit data EGL of the current envelope data EGD and the following middle 2 bit area is used for storing current state data EGS and the remaining lower 4 bit data is not used. The current envelope data EGD indicates the value of the envelope which is currently being generated by tone generator 5. The current state data EGS indicates the state of the envelope currently being generated. These data are written in common RAM 7 by tone generator 5.

(5) Configuration of tone generator 5

The tone generator 5 consists of a tone generating section 51 which generates the left and right channels musical tone signals; a note-on pulse generator 52; a TG (tone generator) address generator 53; and a TG data bus GEB which connects these elements 51 to 53 together.

The tone generating section 51 carries out the following operations (a) to with respect to each sound channel to generate the left and right channels musical tone signals LOUT and ROUT corresponding to the sound channel:

(a) When a load signal LOAD is set to "1" by write operation detecting section 9, reading out voice number Vn from the sound channel data area of common RAM 7, which corresponds to the current sound channel (i.e., the sound channel which is assigned for the tone generation).

(b) Reading out the tone color data from the tone color data area of parameter ROM 9, which corresponds to the voice number Vn obtained by the operation a), and writing the tone color data in the sound channel data area of common RAM 7, which corresponds to the above sound channel which is assigned for the tone generation. Furthermore, outputting a load number LN, when the above reading and writing operation for the tone color data are carried out.

This load number LN is sequentially changed from [0] to [5] during the six sampling periods after the load signal LOAD is changed to "1". The load number LN is used for the relational address for designating the tone color data to be read out from parameter ROM 6 and is also used for calculating the relational address which designates the storage area of the sound channel data area in which the tone color data read out from parameter ROM 6 is to be written. The load number LN is generated by address generator 502 (this will be described later) of tone generating section 51.

(c) Using the sound channel data area of common RAM 7 as storing means for storing the envelope data and sequentially calculating the envelope data of the musical tone to be generated.

(d) Sequentially reading out the waveform sample data corresponding to the voice number Vn from parameter ROM 6 during the above operation (c) and carrying out a manufacture on the waveform sample data based on the tone color data corresponding to the voice number Vn to generate musical tone signals LOUT and ROUT.

Hereinafter, the operation mode in which the above operations (a) and (b) are carried out will be called as a load mode, while the operation mode in which the above operations (c) and (d) are carried out will be called as a sound mode.

The note-on pulse generator 52 observes the note-on flags NON of the all sound channels. When the note-on flag NON of one of the sound channels is changed to "1", note-on pulse generator 52 supplies a note-on signal NONS to tone generating section 51 at the timing corresponding to the sound channel.

Tne TG address generator 53 sequentially supplies the address data $ADR_G$, the contents of which are shown in the following table-1, in each time slot of every sound channels. In the table-1, i designates the current sound channel number. Furthermore, the addresses generated in time slots $T_3$, $T_8$, $T_{11}$ and $T_{14}$ are write addresses, while the addresses generated in the other time slots are read addresses. Furthermore, $A_x$ and $A_y$ designate the relational addresses which are determined based on the above-described load number LN as if LN=[0] then Ax=[9], and if LN=[4] then Ax=[8] and Ay=[5], and if LN=[5] then Ax=[6] and Ay=[7].

TABLE 1

| TG-address $ADR_G$ in each time slot | |
|---|---|
| time slot T0: | 6(i − 1) + 1 |
| time slot T1: | 6(i − 1) + 2 |
| time slot T2: | 6(i − 4) + 3 |
| time slot T3: | 6(i − 3) + Ax |
| time slot T4: | 6(i − 3) + 4 |
| time slot T5: | 6(i − 3) + 5 |
| time slot T6: | 6(i − 3) + 6 |
| time slot T7: | 6(i − 3) + 7 |
| time slot T8: | 6(i − 3) + Ay |
| time slot T9: | 6i + 8 |
| time slot T10: | 6(i − 3) + 9 |
| time slot T11: | 6(i − 4) + 10 |
| time slot T12: | 6(i − 3) + 10 |
| time slot T13: | 6(i − 3) + 11 |
| time slot T14: | 6(i − 4) + 11 |
| time slot T15: | 6i |

In the above formulae, in the case where the value of first item 6(i−k) is a minus value, 6(i−k+12) is used as the first Item of the formula instead of 6(i−k). The first items of the above formulae designate the leading addresses of the sound channel data areas in which the data to be read out for the tone generation of the corresponding sound channels are stored, while the second items of the above formulae designate the relative addresses of the data with respect to the addresses of the leading data.

In addition, the TG address generator 53 generates the first and second write control signals GW and GWa, which are necessary for the access control of common RAM 7, and supplies them to RAM access control section 8. The description for the write control signals will be given later.

The elements of tone generator 5 are connected together via TG data bus GEB which consists of the 0th to the 7th bit lines.

(5a) Configuration of tone generating section 51

Figure 7:
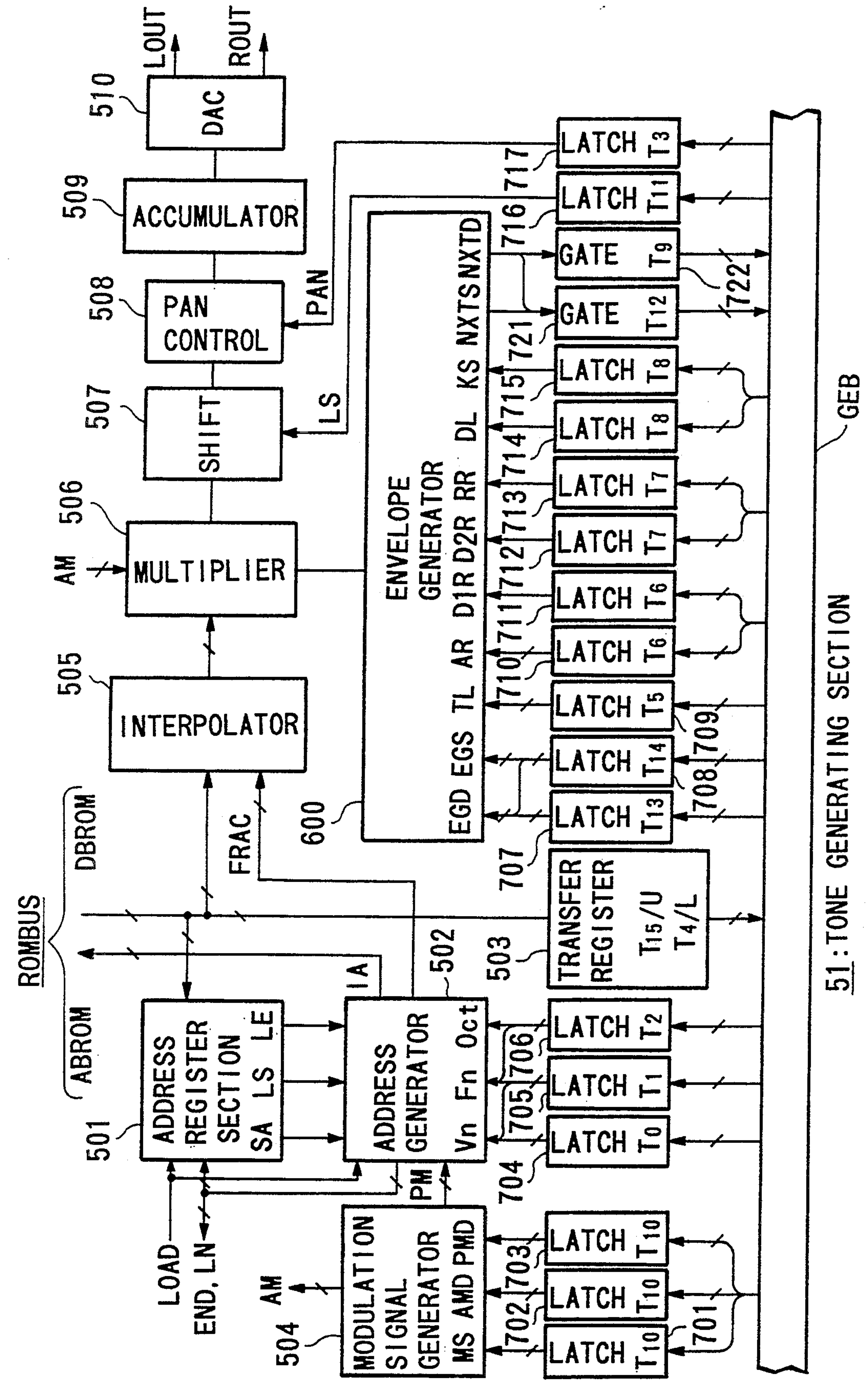
FIG. 7 is a block diagram showing the configuration of a tone generating section 51 provided in the electronic musical instrument shown in FIG. 1.

Next, the configuration of tone generating section 51 will be described with reference to FIG. 7.

Latches 701 to 717 respectively latch the data of the corresponding bit lines of TG data bus GEB at the predetermined time slots. In FIG. 7, one of the symbols T1 (i=0 to 15) is written in each one of the boxes which indicate latches 701 to 717. These symbols indicate the time slots at which the corresponding latches latch the data from TG data bus GEB.

Address register section 501 consists of a 24 bit storage area for storing start address SA, a 16 bit storage area for storing loop start address LS and a 16 bit storage area for storing loop end address LE.

Latches 704 to 706 have a storage capacity of 8 bit. At time slot $T_0$, latch 704 latches the lower bit data VnL of the voice number which are read out from common RAM 7 and outputted on TG data bus GEB. At time slot $T_1$, latch 705 latches the upper bit data VnH (the 0th and first bits) of the voice number and the lower bit data FnL (the second to the 7th bits). At time slot $T_2$, latch 706 latches the upper bit data (the 0th to third bits) of the F number and the octave data Oct (the 4th to 7th bits). The detail description will be given later with respect to the operation in which the above data are read out from common RAM 7 and are outputted on TG data bus GEB.

Address generator 502 supplies the read address to parameter ROM 6. Address generator 502 generates the address in the load mode and in the sound mode, and the address generation of the both modes are carried out by different manners as follows:

In the load mode (LOAD="1"), the address generator 502 generates the load number LN and the address which is determined based on the load number. The address generator 502 has counters which are provided for every sound channels to count the load numbers LN of the corresponding sound channels. When the load signal LOAD becomes "1" at the timing of a sound channel CHi, [0] is set to the counter corresponding to the sound channel CHi as the initial value of the load number LN. Thereafter, the load number LN is sequentially increased by one at the timing of the sound channels CHi of the every sampling periods. These load numbers LN are sequentially supplied to the above-described TG address generator 53 (FIG. 1) and to address register section 501. In the address register section 501, the load number LN is used as a control signal for controlling the writing operation to store the start address, the loop start address and the loop end address which are read out from the parameter ROM 6. When the value of the load number LN is [0], the level shift data is read out from parameter ROM 6 as the upper 8 bit data to be written and the upper bit data of the start address is read out as the lower 8 bit data to be written. Therefore, in this case, the data outputted on the lower 8 bit lines of the ROM data bus DBROM is written in the storage area of the address register section 501 which corresponds to the upper 8 bit data of the start address. Thereafter, the same operations are carried out with respect to the cases of LN=[1] to [3], the start address, the loop start address and the loop end address are stored in the storage areas, which correspond to the kinds of the addresses, of address register section 501.

Furthermore, in the load mode, address generator 502 calculates the value of 6Vn+LN by using the voice number Vn stored in latches 704 and 705 and by using the current value of load number LN, after which address generator 502 supplies the address obtained by tile calculation to parameter ROM 6 via ROM address bus ABROM. When load number LN becomes [5], address generator 502 supplies a load ending signal END, which indicates the ending of the load mode, to writing operation detecting section 9. Writing operation detecting section 9 returns the value of load signal LOAD to "0" by receiving the load ending signal END.

In the sound mode (LOAD="0"), address generator 502 generates the phase data which consists of a integral portion and a fractional portion and which indicates the phase of the waveform data of the musical tone signal to be generated. Address generator 502 supplies waveform address IA, which is determined based on the integer portion of the phase data, to parameter ROM 6, and supplies the fractional portion of the phase data to interpolation section 505, which will be described later. The phase data is obtained by accumulating the pitch data in synchronization with the changing of the sampling period. The pitch data is determined based on F number Fn and octave data Oct, which are stored in latches 705 and 706, and on frequency modulation data PM, which are supplied by a modulation signal generator 504, which will be described later. In addition, when the integral portion of the phase data exceeds the loop end address LE stored in address register 501 during the accumulation of the pitch data, the exceeded part of the accumulated value and loop start address LS are added and the added result is set as the integral portion of the phase data instead of that of the accumulated data. In this manner, the address control for the above-described loop regeneration is achieved.

Transfer register 503 is a register which is provided for sequentially transferring the read out data from parameter ROM 6 to TG data bus GEB. Transfer register 503 transfers the lower 8 bit data of the read out data in time slot $T_4$, and transfers the upper 8 bit data in time slot $T_{15}$.

Latch 701 latches the data MS, which is read out from common RAM 7 and is outputted on the 6th and 7th bit lines of TG data bus GEB, at time slot $T_{10}$. Latch 702 latches the data PMD, which is outputted on the third to 5th bit lines of TG data bus GEB, at time slot $T_{10}$. Modulation signal generator 504 carries out a predetermined operation on the data MS, AMD and PMD stored on latches 701 to 703, and outputs the results as amplitude modulation signal AM and frequency modulation signal PM. The frequency modulation signal PM is used by address generator to generate the phase data as described above.

Interpolator 505 carries out a interpolation on a predetermined number of the waveform sample data, which are supplied to ROM data bus from parameter RAM 6 during the sound mode by using the Interpolation coefficients which are determined based on the fractional portion FRAC of the phase data, and then generates the interpolated result as the waveform data of the musical tone to be generated.

Latches 707 to 715 latch the data outputted on the corresponding lines of TG data bus GEB, at the time slots which are illustrated in the drawing. Envelope generator 600 calculates the state and value of the envelope of the next sampling period based on the current envelope data EGD, the current state data EGS, the total level data TL, the attack rate AR, the first decay rate D1R, the second decay rate D2R, the release rate RR, the reference level DL and the key-scaling coefficient KS, and generates the calculated results as the next state data NXTS and the next envelope data NXTD. Gate 721 receives the next envelope data NXTD outputted by envelope generator 600 and outputs it on TG data bus GEB at time slot $T_9$. The detail description for envelope generator 600 will be given later.

Multiplier 506 multiplies the waveform data outputted by interpolator 505 by the envelope waveform (this will be described later) outputted by envelope generator 600 and the above-described amplitude modulation data AMD. Latch 716 latches the shift data LS, which is read out from common RAM 7 and outputted on the 0th to third bit lines of TG data bus GEB, at time slot $T_{11}$. Latch 717 latches the sound image position data PAN, which is outputted on the 0th to third bit lines of TG data bus GEB, at time slot $T_3$. Shift section 507 shifts the level of the signal outputted by multiplier 506 by the shift data LS latched in latch 716. Sound image position control section 508 distributes the output signal of the shift section 507 into the left and right channels at a distribution ratio which is determined based on the sound image position data PAN stored in latch 717. Accumulator 509 accumulates the output signals corresponding to the all sound channels every sampling period, and outputs the accumulated results as the left and right channel musical tone signals. D/A (Digital/Analog) converter 510 converts the musical tone signals outputted by the accumulator 509 to analog signals, and then outputs the analog signals as the left and right channel musical tone signal LOUT and ROUT to sound channels 10L and 10R shown in FIG. 1.

(5b) Configuration of envelope generator 600

Figure 8:
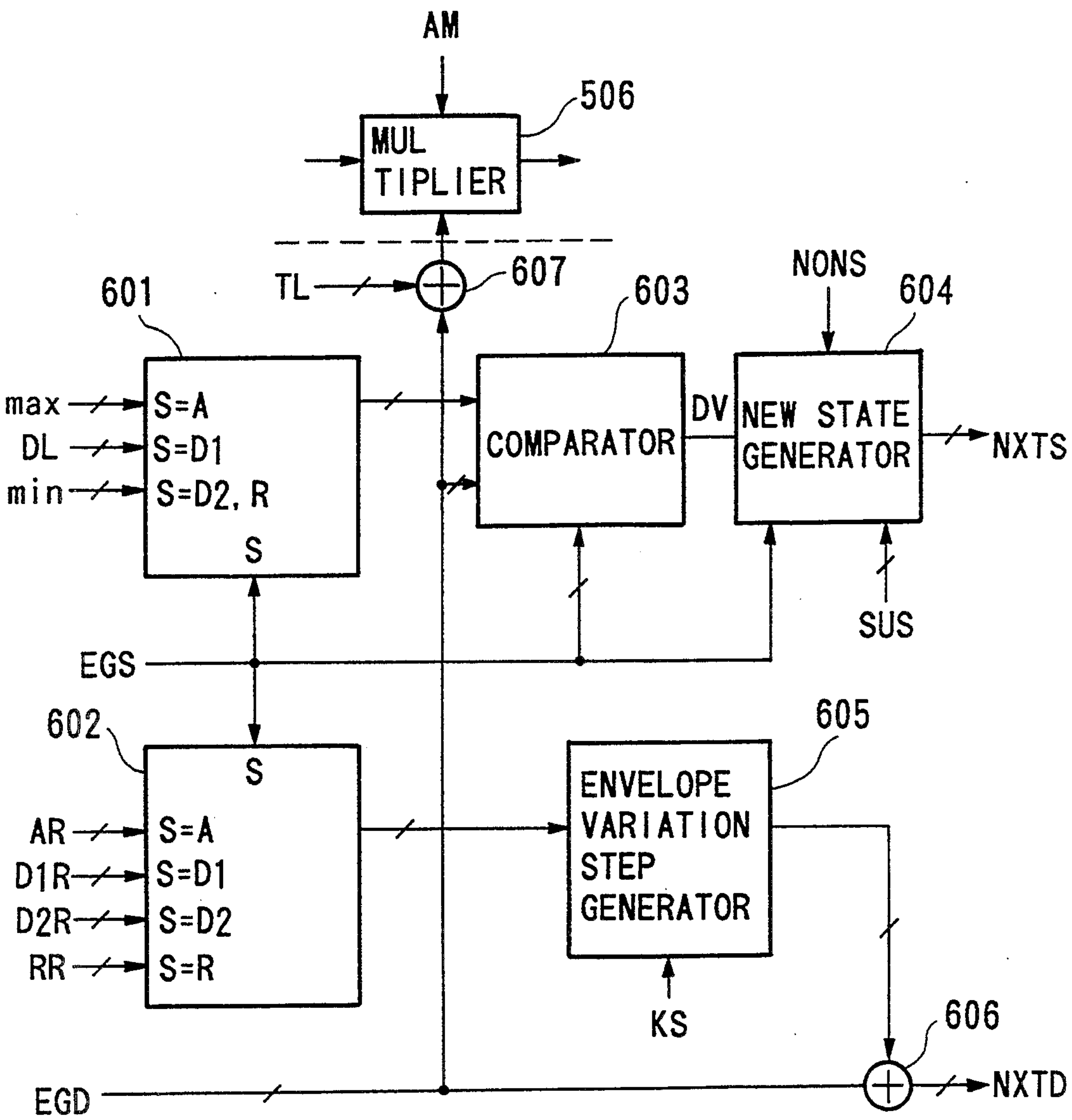
FIG. 8 is a block diagram showing the configuration of an envelope generator 600 provided in the electronic musical instrument shown in FIG. 1.

FIG. 8 is a block diagram showing the configuration of envelope generator 600. Selectors 601 and 602 receive the current state data EGS as the select signal S and select the input signals of the input terminals which are designated by the current state data EGS. More specifically, when receiving the current state data EGS corresponding to the attack part A, selector 601 selects and outputs a predetermined value max; when receiving the current state data EGS corresponding to the first decay part D1, selector 601 selects and outputs the reference level data DL; and when receiving the current state data EGS corresponding to the second decay D2 or release part R, selector 601 selects and outputs a predetermined value min. The values max and min are the constants which respectively define the maximum and minimum values of the envelope waveform. Furthermore, when receiving the current state data EGS corresponding to the attack part A, selector 602 selects and outputs the attack rate AR; when receiving the current state data EGS corresponding to the first decay part D1, selector 602 selects and outputs the first decay rate D1R; when receiving the current state data EGS corresponding to the second decay part D2, selector 602 selects and outputs the second decay rate D2R; and when receiving the current state data EGS corresponding to the release part R, selector 602 selects and outputs the release rate RR.

Comparator 603 compares the output signal of selector 601 with the current envelope data EGD, and outputs the comparison result as a detection signal OV. The output operation of the detection signal OV of comparator 603 is controlled based on the current state data EGS. More specifically, in the case where the state indicated by the current state data EGS corresponds to the attack part A, the comparator 603 outputs the detection signal OV when the current envelope data EGD is more than the output signal of selector 601. In the case where the state indicated by the current state data EGS corresponds to the first decay part D1, the second decay part D2 or the release part R, the comparator 603 outputs the detection signal OV when the current envelope data EGD is equal to or less than the output signal of selector 601. New state generator 604 generates the next state data NXTS, which indicates the state of the next sampling period, based on the note-on signal NONS, the sustain data SUS and the detection signal OV. More specifically, new state generator 604 generates the next state data NXTS corresponding to the attack part A when the note-on signal NONS rises to "1". Thereafter, new state generator sequentially outputs the next state data NXTS corresponding to the first decay part D1 and that corresponding to the second decay part D2 when the detection signal OV is generated. Furthermore, new state generator 604 outputs the next state data NXTS corresponding to the release part R when the note-on signal NONS falls to "0". In the case where sustain data SUS, which indicates that the sustain pedal (not shown) has been actuated, is given to the new state generator 604, the generation of the next state data NXTS corresponding to the release part R is disabled and the second decay part is determined as the final state. Envelope variation step generator 605 adds the output signal of selector 602 with the key-scaling coefficient KS and converts the added result to the variation step data, which defines the variation step of the envelope data, according to a predetermined transformation formula. Adder 606 adds the current envelope data EGD with the variation step data and supplies the added result to multiplier 506 as the above-described envelope waveform data.

(6) Configuration of RAM access control section 8

Figure 9:
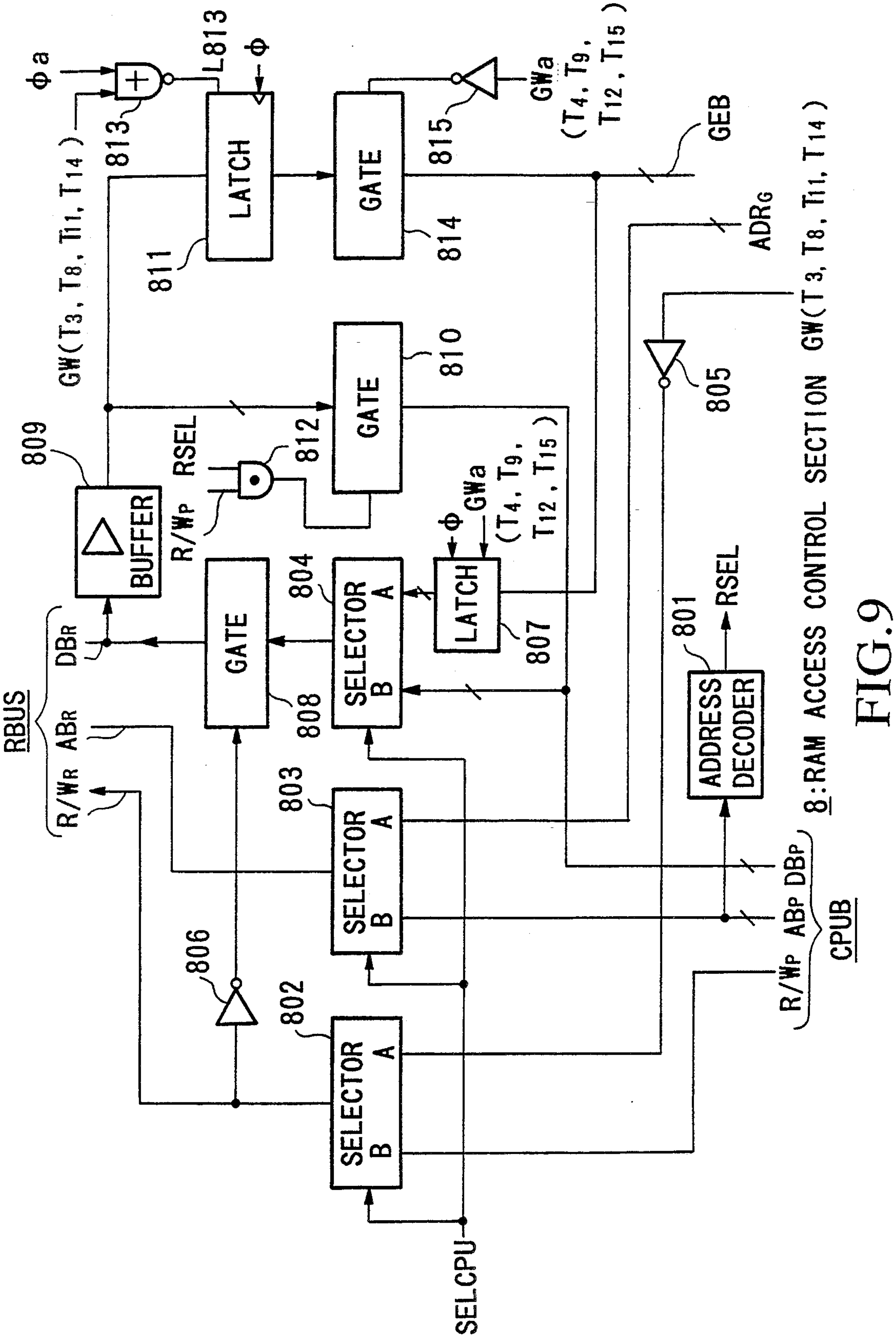
FIG. 9 is a block diagram showing the configuration of a RAM accesss control section 8 provided in the electronic musical instrument shown in FIG. 1.

FIG. 9 shows the detail configuration of the RAM access control section 8. In FIG. 9, the address decoder 801 is a circuit for decoding the address which is outputted on the address bus $AB_P$ of CPU bus CPUB. The address decoder 801 outputs a read select signal RSEL when the address outputted on the address bus $AB_P$ corresponds to the address of the common RAM 7.

Selectors 802 to 804 receive a common select signal SELCPU. The select signal SELCPU is a signal which is generated by timing signal generator 100. The select signal SELCPU is "0" during the first half period of each time slot and is "1" during the latter half period of each time slot. When the select signal SELCPU is "0", selectors 802 to 804 select the input signals of the input terminals A, whereas when the select signal SELCPU is "1", the selectors select the input signals of the input terminals B.

Figure 10:
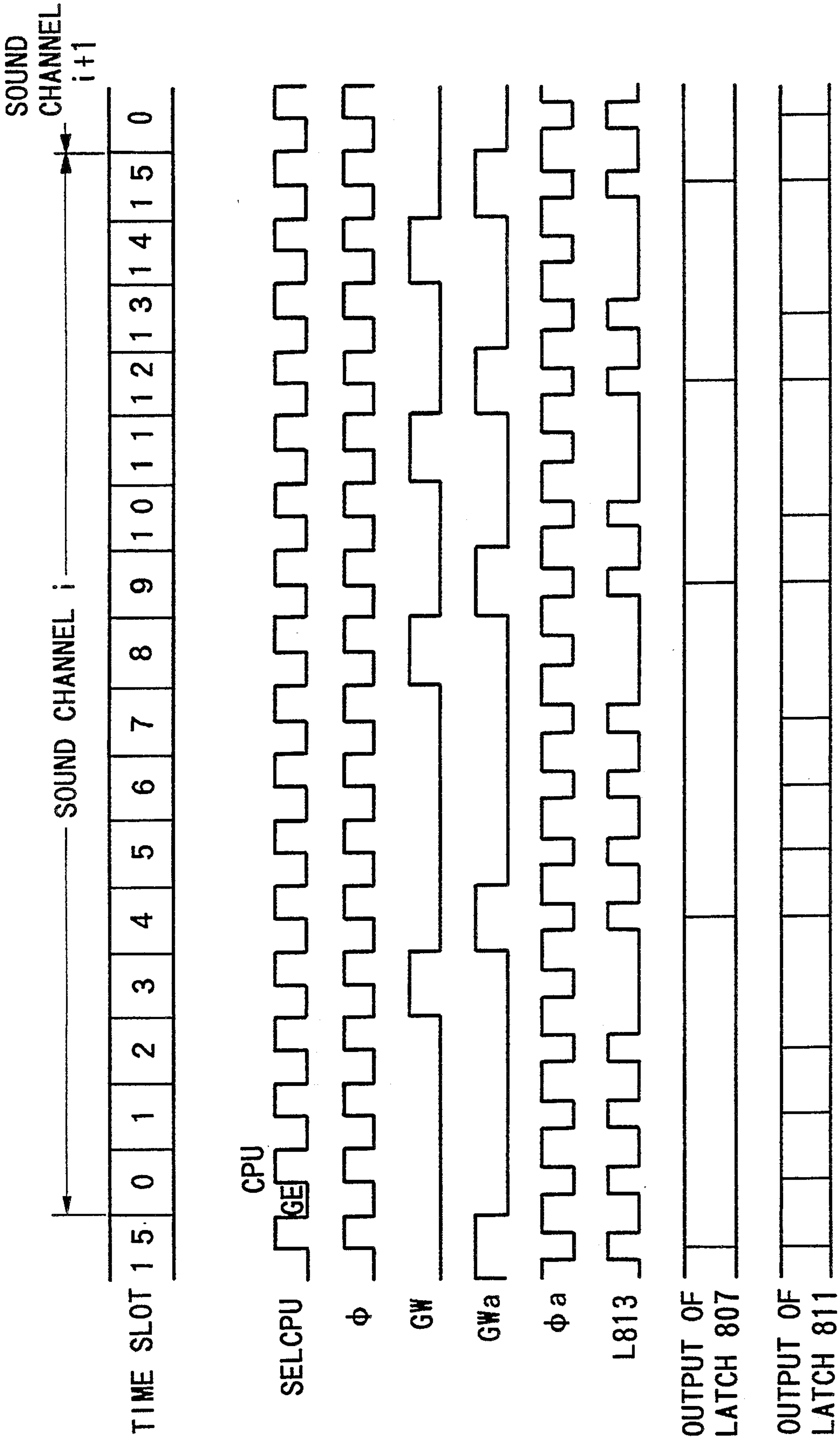
FIG. 10 is a time chart showing the waveforms of control signals which are supplied to the RAM access control section 8 shown in FIG. 9.

The input terminal A of selector 802 receives the output signal of inverter 805 which inverts the first write control signal GW and outputs the result. The first write control signal GW becomes "1" during the third, the 8th, the 11th and the 14th time slots as shown in FIG. 10. The input terminal B of selector 802 is connected to read/write line $R/W_P$ of CPU bus CPUB. The output signal of selector 802 is supplied to the read/write line $R/W_R$ of RAM bus RBUS and to inverter 806.

The input terminal A of selector 803 receives TG address $ADR_G$ which is generated by TG address generator 53. The input terminal B of selector 803 receives the address which is generated by CPU 11 via the address bus $AB_P$. The output signal of selector 803 is supplied to the address bus $AB_R$ of RAM bus RBUS.

The input terminal A of selector 804 receives the output signal of 8 bit latch 807. The data input terminal of latch 807 is connected to TG data bus GEB. The load input terminal of latch 807 receives the second write control signal GWa which is generated by TG address generator 53 and the clock input terminal of the latch receives clock $\phi$ which is generated by timing signal generator 100. As shown in FIG. 10, the trailing edge of clock $\phi$ synchronizes with the changing of time slot, and the second write control signal GWa is "1" during the 4th, the 9th, the 12th and the 15th time slots and is "0" during the other time slots. The data outputted on the data bus $DB_G$ in tone generator 5 is written in latch 807 at the timing of the trailing edge of clock $\phi$ generated at the 4th, the 9th, the 12th and the 15th time slots. On the other hand, the input terminal B of selector 804 is connected to the data bus $DB_P$ of CPU bus CPUB. The output signal of selector 804 is supplied to the data input terminal of gate 808. The enable input terminal of the gate 808 receives the output signal of inverter 806 which inverts the output signal of selector 802 and outputs the result. When the output signal of inverter 806 is "1", the output signal of selector 804 is supplied to the data bus $DB_R$ of RAM bus RBUB by gate 808. In contrast, when the output signal of inverter 806 is "0", the output function of gate 808 is disabled and the output impedance of gate 808 is set to a very high impedance.

Buffer 809 transfers the signal outputted on the data bus $DB_R$ of RAM bus RBUS to the data input terminal of gate 810 and to the data Input terminal of latch 811. The enable input terminal of gate 810 receives the output signal of AND gate 812. AND gate 812 receives the read/write signal via the read/write line $R/W_P$ of CPU bus CPUB and the read select signal RSEL outputted by the address decoder 801. The output terminal of gate 810 and the input terminal B of selector 804 are connected to the data bus $DB_P$ of CPU bus CPUB.

On the other hand, the clock input terminal of latch 811 receives clock $\phi$ and the load input terminal of the latch receives the output signal L813 of NOR gate 813. NOR gate 813 receives the first write control signal GW and clock $\phi a$. This clock $\phi a$ is a timing signal which is generated by the timing signal generator 100 and is changed so that the level of clock $\phi a$ is "1" during periods having a predetermined interval consisting of the first half part prior to the change timing of the time slot and the latter half part following to the the change timing and so that the level of the clock is "0" during the other periods, each one consisting of the first half part prior to the leading edge of clock $\phi$ and the latter half part following to the leading edge, as shown in FIG. 10. In response to such input signals, the output signal L813 of NOR gate 813 is "1" during the 0th to the second time slots and during the 4th to the 7th time slots and during the 9th, the 11th, the 12th, the 13th and the 15th time slots whereby the output signal of buffer 809 is inputted to latch 811 during these time slots. The output signal of latch 811 is supplied to the data input terminal of gate 814. The enable input terminal of this gate 814 receives the output signal of inverter 815 which inverts the second write control signal GWa and outputs the result. The output terminal of gate 814 and the data input terminal of latch 807 are connected to TG data bus GEB.

Operation of the Embodiment (1) Overall operation

Figure 11:
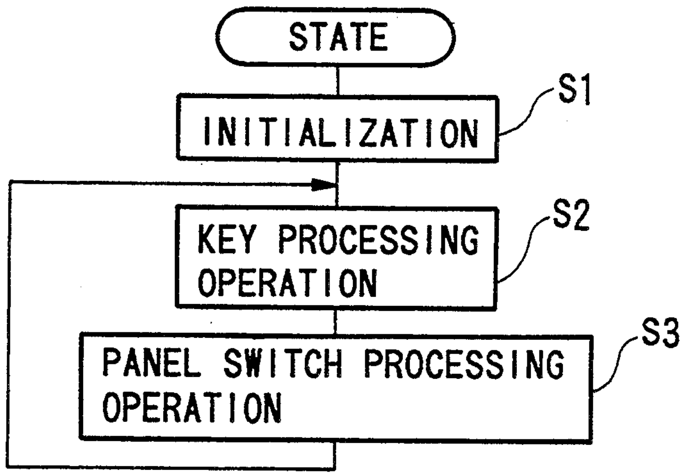
FIGS. 11 to 13 are flow charts showing the operation of a CPU provided in the electronic musical instrument shown in FIG. 1.
Figure 12:
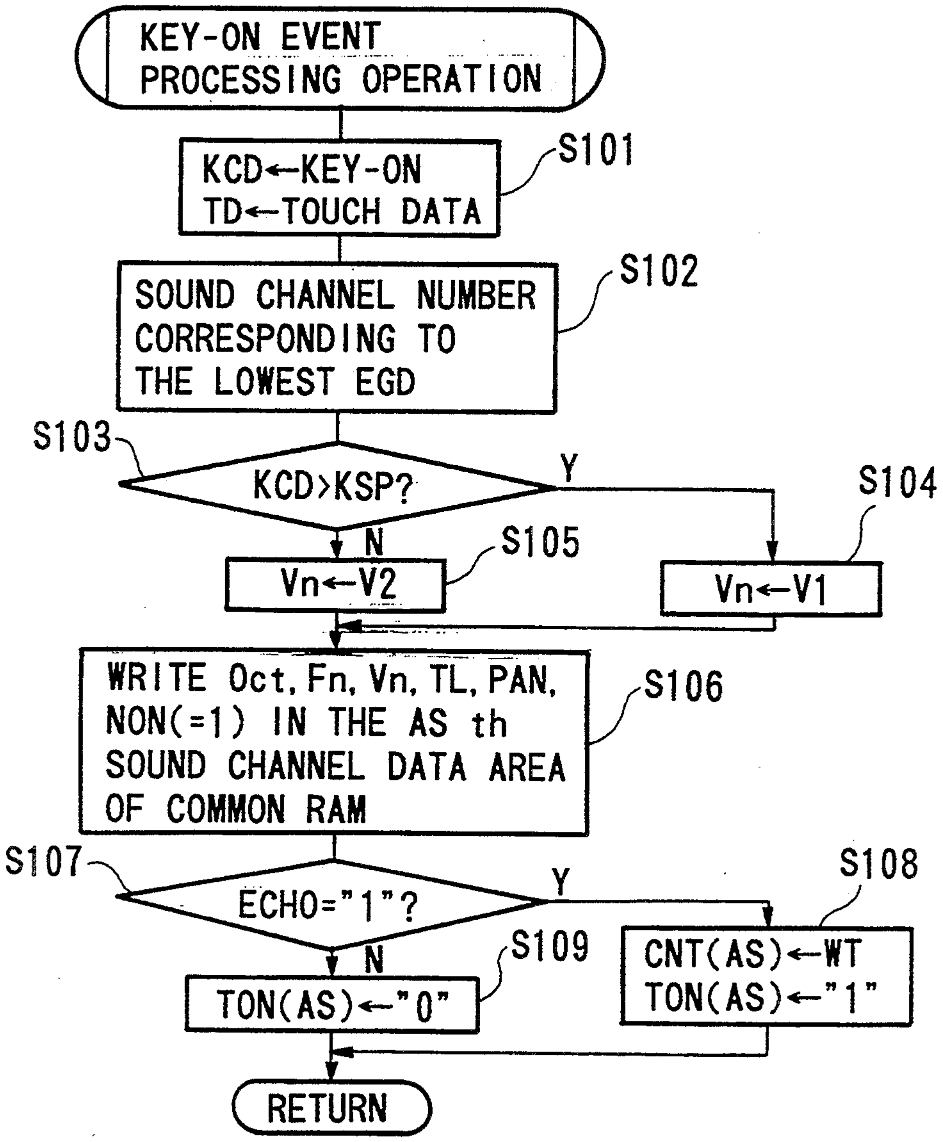

When the power switch of this electronic musical instrument is set to on-state and electronic power is supplied to the portions of the instrument, CPU 11 starts to execute the main routine, the flow chart of which is shown in FIG. 11. In step S1, CPU 11 executes an initial setting operation to write initial values in the storage areas of common RAM 7. After the completion of the initial setting operation, the routine proceeds to step S2, wherein CPU 11 executes the key processing operation in response to the key-depressing or key-releasing operation applied to keyboard 2. More specifically, when any key of the keyboard 2 is depressed, the key-on event is detected by CPU 11. As a result, CPU 11 executes the key-on event processing operation routine, the flow chart of which is shown in FIG. 12, as key processing operation. On the other hand, when any key of keyboard 2 is released, the key-off event is detected by CPU 11. As a result, CPU 11 executes the key-off event processing operation (the illustration of the flow chart is omitted) as key processing operation. Next in step S3, CPU 11 executes the panel switch processing operation in response to the operation applied to the switches in panel switch group 3. After the completion of step S3, the routine returns to step S2. Thereafter, CPU 11 repeatedly executes the operations of steps S2 and S3.

Figure 13:
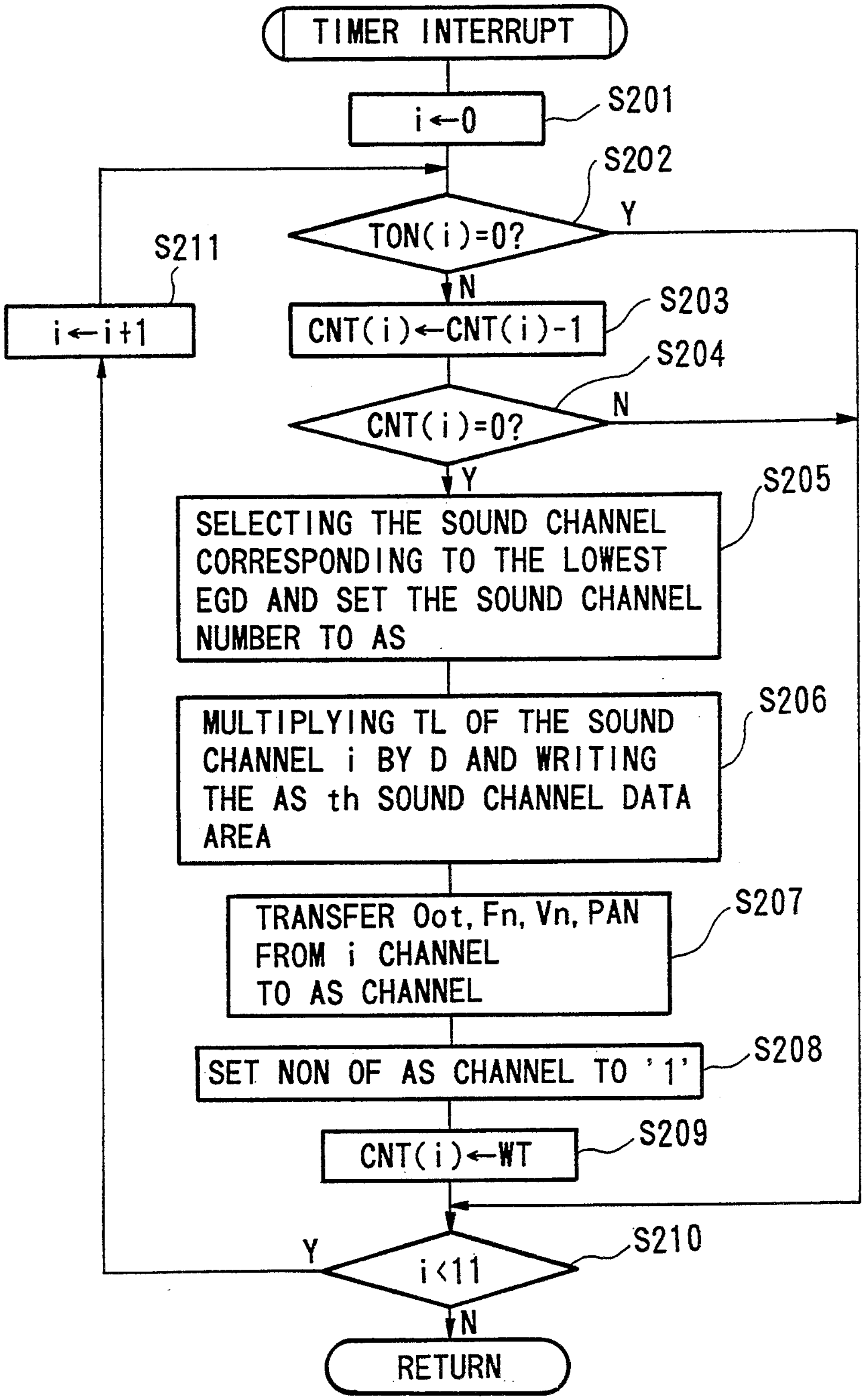

On the other hand, timer interrupt signal is supplied to CPU 11 from timer 12 every time a predetermined interval time has lapsed. CPU 11 interrupts the current operation and executes the timer interrupt routine, the flow chart of which is shown in FIG. 13, in response to the timer interrupt signal. In step S201, CPU 11 executes an operation to set [0] to a control variable i. More specifically, CPU 11 outputs the address corresponding to the control variable i on the address bus $AB_P$ and outputs data [0] on the data bus $DB_P$ and outputs "0" on the read/write line $R/W_P$ as the read/write signal. As a result, [0] is written in the addressed storage area, which is one of the work areas of common RAM 7 and corresponds to the control variable i, during the latter half period of the current time slot. Next, the routine proceeds to step S202, a judgement is made as to whether the content of sound channel echo flag TON(i), which corresponds to the current value of the control variable i, is "0" or not. More specifically, CPU 11 outputs the address corresponding to the sound channel echo flag TON(i) on the address bus $AB_P$ and outputs "1" on the read/write line $R/W_P$ as the read/write signal. As a result, the content of the sound channel echo flag TON(i) is read out from the addressed storage area, which is one of the work areas of common RAM 7 and corresponds to the sound channel echo flag, during the latter half period of the current time slot. The sound channel echo flag TON(i) is a flag which designates whether an echo sound is to be generated or not in the corresponding sound channel CHi. When the echo sound is to be generated in the sound channel CHi, "1" is stored in the sound channel echo flag TOM(i), whereas when the echo sound is not to be generated, "0" is stored in the sound channel echo flag. The write operation to the sound channel echo flag will be described later. CPU 11 judges whether the content of the sound channel echo flag thus read out is "0" or not. When the judgement in step S202 is [NO], the routine proceeds to the operations following to step S202. In contrast, when the judgement in step S202 is [YES], the routine proceeds to step S210, wherein the control variable i stored in common RAM 7 is read out and a judgement is made as to whether the read out control variable i is less than [11] which is the number of sound channels provided on the electronic musical instrument. When the result of this judgement is [YES], the routine proceeds to step S211, wherein [1] is added to the control variable i, which has been previously read out in step S210, and the added result is written in the storage area which is one of the work areas of common RAM 7 and corresponds the control variable i, after which the routine returns to step S202. Thereafter, the judgement of step S202 is carried out with respect to i=[1] to [11]. When the result of the judgement in step S210 becomes [NO], i.e., when the above-described operations have been carried out with respect to the all sound channels CHi (i=[0] to [11]), the timer interrupt routine is ended and CPU 11 executes again the operation which has been previously interrupted.

When a performer operates the operational members provided on the control panel to input the voice number which corresponds to the upper keys of keyboard 2, the input voice number is written in the storage area of common RAM 7 corresponding to the upper key voice number V1. On the other hand, when an echo switch (not shown) provided on the control panel is operated and the echo switch is thereby changed to on-state. "1" is written in the storage area of common RAM 7 as echo flag ECHO, whereas when the echo switch is changed to off-state by the operation of the echo switch, "0" is written as the echo flag.

When the performer depresses any key of keyboard 2, the key-on event is detected and the key-on event processing operation routine is thereby executed as the key processing operation in step S2. In step S101, the key-code of the depressed key and the key velocity of the key depressing operation are determined based on the key-on event, and the key-code and the key velocity are written in common RAM 7 as key-code data KCD and touch data TD. Next, in step S102, the current envelope data EGD (=EGH+EGL) corresponding to the all sound channels CHi (i=0 to 11) are sequentially read out from the sound channel data areas of common RAM 7. The current envelope data EGD having the lowest value is selected from the all current envelope data EGD and the sound channel number i of the sound channel which corresponds to the selected current envelope data EGD is written in common RAM 7 as assigned sound channel data AS. Next, in step S103, a judgement is made as to whether the key-code data KCD, which has previously been written In common RAM 7 in step S101, is greater than a key-split point data KSP, which corresponds the point dividing the keys of keyboard 2 into the upper keys and the lower keys, or not. When the result of this judgement is [YES], the upper key voice number V1 is read out from common RAM 7 as the voice number Vn of the musical tone to be generated (step S104), whereas when the result of the judgement is [NO], the lower voice number V2 is read out as the voice number Vn of the musical tone to be generated (step S105).

Next, in step S106, octave data Oct, F number Fn and sound image position data PAN are calculated based on the key-code data KCD and total level data TL is calculated based on the touch data TD. In the calculation of the sound image position data, when the key-code data KCD corresponds to a low tone pitch, the sound image position data PAN for positioning the sound image at left side is calculated, whereas when the key-code data corresponds to a high tone pitch, the sound image position data for positioning the sound image at right side is calculated. In the calculation of the total level data, the greater touch data TD generates the greater total level data TL. Octave data Oct, F number Fn (=FnH+FnL), voice number Vn (=VnH+VnL), total level data TL and sound image position data PAN thus calculated are written in the sound channel data area of common RAM 7 corresponding to the sound channel AS. Furthermore, "1" is written in the sound channel data area corresponding to the sound channel AS as note-on flag NON. As a result, tone generator 5 starts the musical tone generation corresponding to the sound channel AS. The detail description for this musical tone generation will be given later.

After the completion of step S106, the routine proceeds to step S107, wherein the echo flag ECHO is read out from the work area of common RAM 7 and a judgement is then made as to whether the echo flag is "1" or not. When the result of this judgement is [YES], the routine proceeds to step S108, wherein the assigned sound channel data AS is read out from the common RAM 7 and a predetermined value WT is written in the work area of the common RAM as time count data CNT(AS) which corresponds to the sound channel AS. Furthermore, "1" is written in the work area corresponding to the sound channel AS as sound channel echo flag TON(AS). After the completion of these operations, the routine returns to the main routine. On the other hand, when the result of the judgement in step S107 is [NO], the routine proceeds to step S109, wherein "0" is written in the work area of the common RAM 7 as sound channel echo flag TON(AS), after which the routine returns to the main routine.

When the performer releases the key which has been previously depressed, the key-off event is detected by CPU 11. As a result, CPU 11 executes the key-off event processing operation routine (the illustration of the flow chart is omitted) as the key-processing operation of step S2. More specifically, CPU 11 determines the sound channel through which the tone generation for the key-code corresponding to the detected key-off event is carried out, and writes "0" in the sound channel data area of common RAM 7 corresponding to the sound channel as note-on flag NON. As a result, a damp operation for the sound channel is carried out. The detail description for this damp operation will be given later.

(2) Tone generating operation and damp operation

Next, the description will be given with respect to the tone generating operation carried out by tone generator 5. When CPU 11 executes the operation of step S106 of the key-on event processing operation routine and the lower bit data VnL of the voice number Vn is thereby written in the sound channel data area of common RAM 7 corresponding to the sound channel AS, the writing operation is detected by write operation detecting section 9. As a result, "1" is outputted as load signal LOAD by write operation detecting section 9 and the operational mode of tone generator 5 for the sound channel AS is set to load mode.

(2a) Load mode

In the load mode, parameters for controlling the musical tone generation by using the sound channel AS are set in common RAM 7. More specifically, the tone color data corresponding to the voice number Vn of the musical tone to be generated are sequentially read out form parameter ROM 6 and the read out tone color data are sequentially written in the sound channel data area of common RAM 7 corresponding to the sound channel AS. This writing operation of common RAM 7 for the sound channel AS are not continuously performed in a batch style but are performed at distributed time points on time axis in a time division control manner by using the predetermined time slots of a plurality of sound channels which follow to the key-on time at which the key-on event is detected. During the time slots in which the writing operation for the sound channel AS is not performed, the accesses of common RAM 7 for the other sound channels are performed. As the accesses of common RAM for the sound channel AS are performed at distributed time points in time axis, the control for the sound channel AS and the control for the other sound channels by using common RAM 7 can be performed in a parallel manner. In the sound mode which will be described later, the tone color data thus written in the sound channel data area of common RAM 7 corresponding to the sound channel AS are sequentially read out and the tone generating operation is performed based on these read out tone color data by tone generating section 51. In the tone generating operation, the stored data in common RAM 7, which indicate the intermediate results of the musical tone generating operation (in this embodiment, the data correspond to the current envelope data and state data), are sequentially updated. In the load mode, the read out data of common RAM 7 are latched in latches 701 to 717, but these latched data are not used for the tone generating operation. Next, the detail description will be given with respect to the operation in the load mode.

Figure 14:
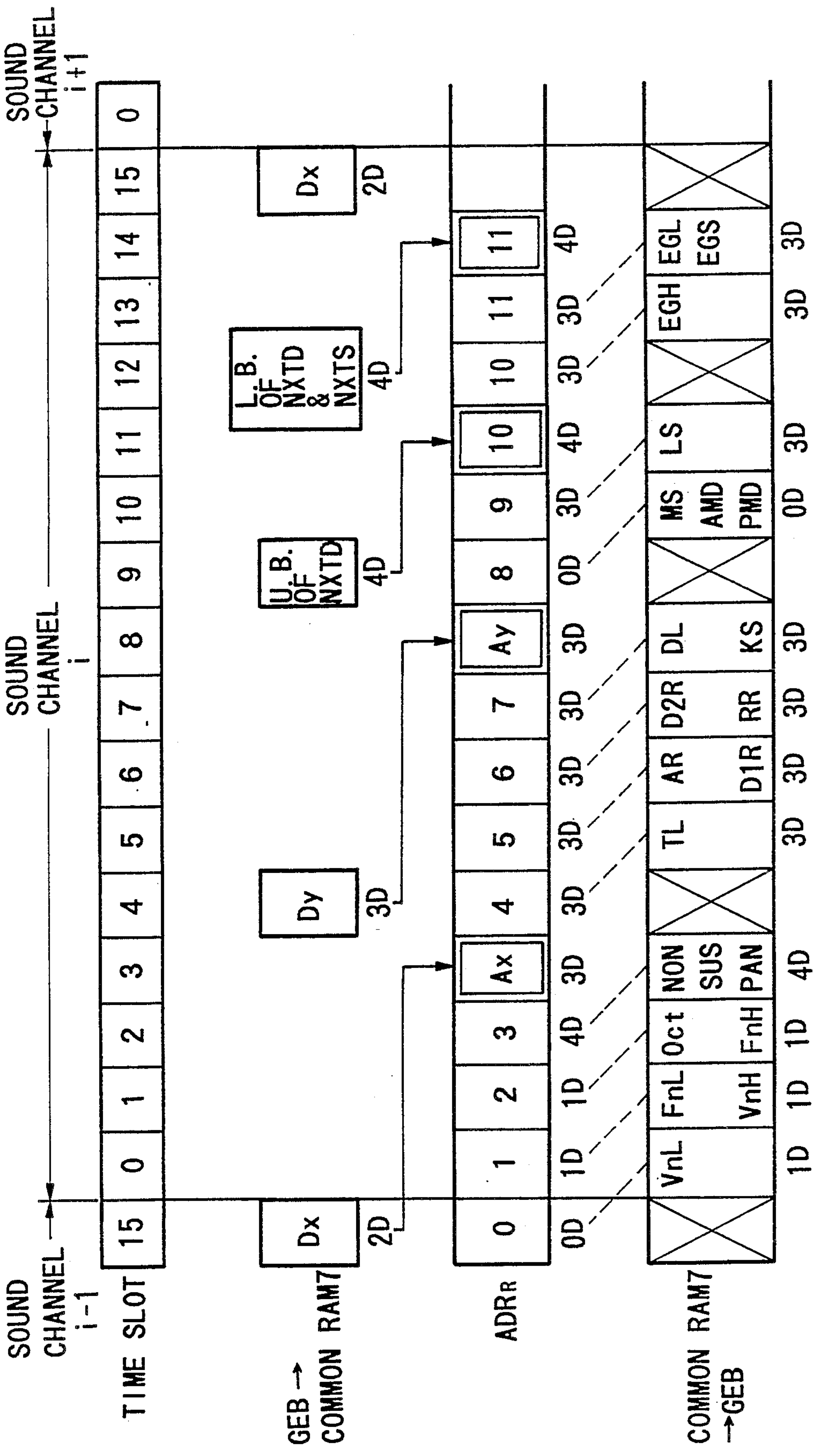
FIGS. 14 to 16 are time charts showing the operation of the electronic musical instrument shown in FIG. 1.
Figure 15:
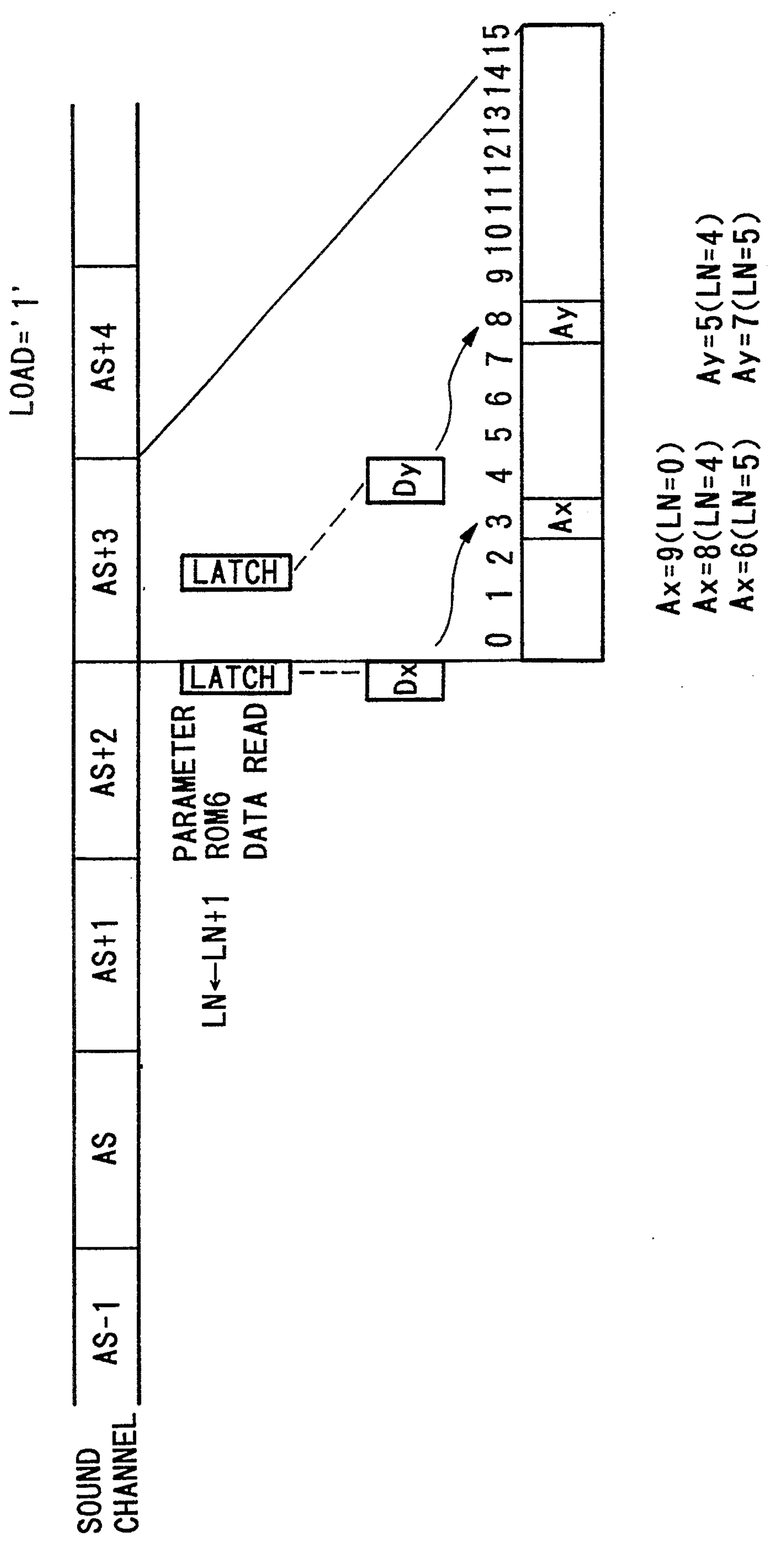

FIG. 14 is a time chart showing the data outputted on TG data bus GEB, the address supplied to common RAM 7 via RAM address bus $AB_R$ and the data read out from common RAM 7 and outputted on TG data bus GEB with respect to each time slot. In FIG. 14, one of symbols 2D to 4D is indicated on the area under each area on which the data outputted on the TG data bus GEB during the corresponding time slot is shown. These symbols indicate the sound channel number for which the corresponding data is to be used. More specifically, if nD (n=2 or 3 or 4) is indicated for one of the above data, the data is to be used for the tone generation using the sound channel which is n channels prior to the current sound channel. For example, 3D is indicated on the area under the data by which is outputted during time slot $T_4$. This indicates that the data Dy is to be used for the tone generation using the sound channel 3 channels prior to the current sound channel. The symbols are also indicated for the address $ADR_G$ supplied to the common RAM 7 and for the data read out from the common RAM and supplied to the TG data bus GEB in order to indicate the sound channel for which the corresponding data is to be used. In addition, as the address $ADR_R$, the relational address of the corresponding data in the sound channel data area is indicated. Furthermore, FIG. 15 is a time chart showing the operation of the tone generator 5 in the load mode. Hereinbelow, the operation of the tone generator 5 in the load mode will be described with reference to these drawings.

When the load signal LOAD is changed to "1" and the operational mode is thereby set to the load mode, the content of the load number LN corresponding to the sound channel AS is set to [0]. During the time slot $T_9$ of the sound channel AS, the data 6AS+8 is generated by the TG address generator 53 the TG address $ADR_G$ in the case where the load number LN is [0]. The TG address $ADR_G$=6AS+8 is selected by the selector 803 of the RAM access control section 8 and is supplied to the common RAM 7 via the RAM address bus $AB_R$ during the first half period of the time slot $T_9$. As a result, the modulation control data MS, AMD and PMD are read out from the storage area of the sound channel data area which corresponds to the sound channel AS and the relational address is [8]. These modulation data are supplied to the data input terminal of the latch 811 via the buffer 809 of the RAM access control section 8. The modulation data MS, AMD and PMD thus read out are latched in the latch 811 at the leading edge of the clock $\phi$ during the time slot $T_9$. During the time slot $T_9$, the gate 814 maintains the output disable state because "1" is given thereto as the second write control signal GWa. Next, during the time slot $T_{10}$, the output operation of the gate 814 is enabled and the modulation control data MS, AMD and PMD, which are latched in the latch 814, are outputted on the TG data bus GEB via the gate 814. These modulation control data MS, AMD and PMD are latched in the latches 701 to 703 of the tone generating section 51 during the same time slot $T_{10}$. However, these latched data is not used for the tone generation in the load mode.

Next, during the time slot $T_{15}$, 6AS is generated by the TG address generator 53 as $ADR_G$. This TG address $ADR_G$=6AS is supplied to the common RAM 7 via the selector 803 of the RAM access control section 8 during the first half period of the same time slot $T_{15}$. As a result, the lower bit data VnL of the voice number Vn is read out from the storage area of the sound channel data area which corresponds to the sound channel AS and the relative address is [0]. The read out data is supplied to the data input terminal of the latch 811 via the buffer 809 of the RAM access control section 8. The data VnL is latched in the latch 811 at the leading edge of the clock $\phi$ during the time slot $T_{15}$. Next, during the time slot $T_0$ of the sound channel AS+1, the data VnL latched in the latch 811 is outputted on the TG data bus GEB via the gate 814 and is latched in the latch 704 of the tone generating section 51. This data VnL and the data VnH which will be described later are used for the address generation to access the parameter ROM 6.

Next, the sound channel is changed to the sound channel AS+1 from the sound channel AS. During the time slot $T_0$ of the sound channel AS+1, the load number LN which is to be set for the next sampling period is determined by increasing the load number LN of the current sampling period by [1]. Furthermore, the TG address $ADR_G$ is determined based on the current sound channel number i=AS+1 as $ADR_G$=6(i−1)+1=6AS+1 and the TG address thus determined is outputted by TG address generator 53. This TG address $ADR_G$=6AS+1 is supplied to the common RAM 7 during the first half period of the same time slot $T_0$. As a result, the lower bit data FnL of the F number Fn and the upper bit data VnH of the voice number Vn are read out from the storage area of the sound channel data area of the common RAM 7 which corresponds to the sound channel AS and the relational address is [1]. The read out data are latched in the latch 811 by the leading edge of the clock $\phi$ during the time slot $T_0$. Next, during the time slot $T_1$, the data FnL and VnH latched in the latch 811 are outputted on the TG data bus GEB via the gate 814 and are latched in the latch 705 of the tone generating section 51. The data VnH and the data VnL are used for the address generation to access the parameter ROM 6 as described above. Furthermore, during the same time slot $T_1$, the TG address $ADR_G$=6(i−1)+2=6AS+2 is generated based on the current sound channel number i=AS+1 by the TG address generator 58. The TG address $ADR_G$=6AS+2 is supplied to the common RAM 7 during the first half period of the time slot $T_1$. As a result, the octave data Oct and the upper bit data FnH of the F number Fn are read out from the storage area of the sound channel data area of the common RAM 7 which corresponds to the sound channel AS and the relational address is [2]. The read out data are latched in the latch 811 by the leading edge of clock $\phi$ during the time slot $T_1$. The data Oct and FnH latched in the latch 811 are outputted on the TG data bus GEB via gate 814 during the time slot $T_2$ and are latched in the latch 706 of the tone generating section 51.

In this manner, the modulation control data MS, AMD and PMD for the musical tone to be generated by the sound channel AS are read out and are latched in the latches 701 and 702 of the tone generating section 51. During the next sound channel AS+1, the voice number Vn, the F number Fn and the octave data Oct of the musical tone to be generated by the sound channel AS are read out from the common RAM 7 and are latched in the latches 704 to 709.

Next, during the sound channel AS+2, the address 16Vn+LN is generated based on the voice number Vn of the musical tone to be generated, which are stored in the latches 704 and 705, by the address generator 502. The address 16Vn+LN thus generated is supplied to the parameter ROM 6 via the ROM address bus ABROM. As a result, the level shift data LS and the upper 8 bit data SAH of the start address SA are read out from the storage area of the tone color data areas which corresponds to the voice number Vn and the relational address is [0] in the case where the current value of the load number LN is [0]. The read out data are outputted on the ROM data bus DBROM. The upper 8 bit data Dx contained in the read out data consisting of total 16 bits, i.e., the level shift data LS in this case is outputted on the TG data bus GEB via the transfer register 503 during the time slot $T_{15}$. During the same time slot $T_{15}$, "1" is generated as the second write control signal GWa by the TG address generator 53. As a result, the data LS outputted on the TG data bus GEB is latched in the latch 807 of the RAM access control section 8 by the leading edge of the clock $\phi$ during the time slot $T_{15}$. On the other hand, the lower 8 bit data contained the total 16 bit data outputted on the ROM data bus DBROM, i.e., the upper 8 bit data SAH of the start address SA is written in the corresponding storage area of the address register section 501 because the current value of the load number LN is [0].

During the time slots T0 to T2 of the next sound channel AS+3, the latch 807 holds the data LS because "0" is generated as the second write control signal GWa. Next, during the time slot $T_3$, the TG address $ADR_G$ is calculated based on the relational address Ax=[9] which corresponds to the current load number LN=[0] and the sound channel number i=AS+3 as $ADR_G=6(i-3)+Ax=6AS+9$ and the calculated address is outputted by the TG address generator 53. The TG address $ADR_G=6AS+9$ is supplied to the common RAM 7 during the first half period of the time slot $T_3$. During the same time slot $T_3$, the first write control signal GW is "1". As a result, during the first half period of the same time slot $T_3$, the signal "0", which is obtained by inverting the first write control signal GW by the invertor 805, is supplied to the common RAM 7 via the selector 802 and the read/write line $R/W_R$. The signal "0" is outputted by the selector 802 and the output signal of the selector 802 is inverted and supplied to the gate 808. As a result, the output operation of the gate 808 is disabled. The shift data LS held in the latch 807 is selected by the selector 804 and the output data of the selector passes through the gate 808 and is written in the storage area of the sound channel data area of the common RAM 7 which corresponds to the sound channel AS and the relational address is [9].

Next, during the time slot $T_4$ of the sound channel AS+3, the TG address $ADR_G=6(i-3)+4=6AS+4$ is generated based on the current sound channel number i=AS+3. The TG address $ADR_G=6AS+4$ is supplied to the common RAM 7 during the first half period of the time slot $T_4$. As a result, the data is read out from the storage area of the sound channel data area of the common RAM 7 which corresponds to the sound channel AS and is the storage area for the total level data TL corresponding to the relational address [4]. The read out data from the common RAM 7 is latched in the latch 709 of the tone generating section 51 during the time slot $T_5$. However, the total level data TL latched in the latch 709 is not used for the tone generation.

In the next sound channel AS+3, the data are sequentially read out from the storage areas of the sound channel data areas of the common RAM 7 which correspond to the sound channel AS and the relational addresses are [5], [6] and [7] during the time slots $T_5$, $T_6$ and $T_7$, and the read out data corresponding to the relational addresses [5], [6] and [7] are sequentially latched in the latches 710 to 715 during the time slots $T_6$, $T_7$ and $T_8$. However, these data latched in the latches 710 to 715 are not used for the control of the tone generation like the data latched in the latch 709, in the same sound channel AS+3, the data are sequentially read out from the storage areas of the sound channel data areas of the common RAM 7 which correspond to the sound channel AS and the relational addresses are [9], [10] and [11] during the time slots $T_{10}$, $T_{12}$ and $T_{13}$, and the read out data corresponding to the relational addresses [9], [10] and [11] are sequentially latched in the latches 716, 717, 707 and 708 during the time slots $T_{11}$, $T_{13}$ and $T_{14}$. However, these data latched in the latches 716, 717, 707 and 708 are not used for the control of the tone generation.

Next, in the sound channel AS+4, the data is read out from the storage area of the sound channel data area of the common RAM 7 which corresponds to the sound channel AS and the relational address is [3]. However, this read out data is not used for the control of the tone generation. Next, in the sound channel AS+5, no access are performed for the common RAM 7 and the parameter ROM 6 for the control of the sound channel AS.

The load number LN is set to [1] when the sampling period is changed to the new sampling period and the sound channel AS of the new sampling period begins. During the sound channel AS+2 of the new sampling period, the address 16Vn+LN is generated based on the voice number Vn of the musical tone to be generated, which are stored in the latches 704 and 705, and on the current load number LN by the address generator 502, and the generated address is supplied to the parameter ROM 6 via the ROM address bus ABROM. In this case, the content of the load number LN is [1]. Therefore, the middle 8 bit data SAM and the lower 8 bit data SAL of the start address SA are read out from the storage area of the tone color data areas which corresponds to the voice number Vn and the relational address is [1], and the read out data is outputted on the ROM data bus DBROM. The read out data consisting of 16 bits is written in the corresponding storage area of the address register section 501 because the current load number LN is [1]. During the period in which the load number LN is [1], the data are sequentially read out from the common RAM 7 at the timing of the predetermined time slots of each sound channel like the period in which the load number LN is [0]. However, these data are not used for the control of the tone generation.

Next, when the sampling period is changed and the load number LN becomes [2] by the beginning of the new sampling period, the upper 8 bit data LSH and the lower 8 bit data LSL of the loop start address LS are read out from the tone color data area of the parameter ROM 6 corresponding to the voice number Vn which is held in the latch latches 704 and 705 and corresponds to the musical tone to be generated, and the read out data are written in the corresponding storage areas of the address register section 501. Next, when the sampling period is changed and the load number LN becomes [3] by the beginning of the new sampling period, the upper 8 bit data LEH and the lower 8 bit data LEL of the loop end address LE are read out from the tone color data area of the parameter ROM 6 corresponding to the voice number Vn which is held in the latch latches 704 and 705 and corresponds to the musical tone to be generated, and the read out data are written in the corresponding storage areas of the address register section 501. As mentioned above, the prepareing process for reading out the waveform sample data, which will be used for the tone generation corresponding to the sound channel AS, has completed. Thereafter, during the periods in which the load number LN is [2] or [3], the data are read out from the common RAM 7 at the timming of the predetermined time slots of each sound channel like the case in which the load number LN is [0]. However these read out data are not used for the control of the tone generation.

Next, when the sampling period is changed and the load number LN becomes [4] by the beginning of the new sampling period, during the sound channel AS+2 of the new sampling period, the address 16Vn+LN=16Vn+4 is generated for the parameter ROM 6 based on the voice number Vn stored in the latches 704 and 705 and the current load number LN=[4] by the address generator 502. As a result, the upper 8 bit data consisting of the modulation control data MS, AMD and PMD and the lower 8 bit data consisting of the attack rate AR and the first decay rate D1R are read out from the storage area of the tone color data areas which corresponds to the voice number Vn and the relational address is [4]. In these read out data consisting of 16 bits, the upper 8 bit data consisting of the modulation control data MS, AMD and PMD are outputted on the TG data bus GEB by the transfer register 503 during the time slot $T_{15}$. During the same time slot $T_{15}$, the second write control signal GWa becomes "1". As a result, the modulation control data MS, AMD and PMD are latched in the latch 807 of the RAM access control section 8 at the leading edge timing of the clock $\phi$.

Next, during the time slot $T_3$ of the sound channel AS+3, the TG address $ADR_G=6(i-3)+Ax=6AS+8$ is calculated and outputted based on the relational address Ax=[8] which corresponds to the current load number LN=[4] and on the sound channel number i=AS+3 by the TG address generator 53. The TG address $ADR_G=6AS+8$ is supplied to the common RAM 7 during the first half period of the time slot $T_3$. Furthermore, the first write control signal GW is "1" during the time slot $T_3$. As a result, the modulation control data MS, AMD and PMD held in the latch 807 are selected by the selector 804 and the selected data pass through the gate 808 and are written in the storage area of the sound channel data area of the common RAM which corresponds to the sound channel AS and the relational address is [8].

On the other hand, the lower 8 bit data of the 16 bit read out data of the parameter ROM 6, which is read out during the sound channel AS+2 and consists of the attack rate AR and the first decay rate D1R, is outputted on the TG data bus GEB during the time slot $T_4$ of the sound channel AS+3, and the output data is latched in the latch 807 of the RAM access control section 8 at the leading edge timing of the clock $\phi$ during the time slot $T_4$.

Next, during the time slot $T_8$ of the sound channel AS+3, the TG address $ADR_G=6(i-3)+Ay=6AS+5$ is calculated and ountputted based on the relational address Ay=[5] which corresponds to the current load number LN=[4] and on the sound channel number i=AS+3 by the TG address generator 53. The TG address $ADR_G=6AS+5$ thus outputted is supplied to the common RAM 7 during the first half period of the time slot $T_8$. During the same time slot $T_8$, "1" is generated as the first write control signal GW. As a result, the attack rate AR and the first decay rate D1R held in the latch 807 are selected by the selctor 804, and the selected data pass through the gate 808 and are written in the storage area of the sound channel data area of the common RAM 7 which corresponds to the sound channel AS and the relational address is [5].

Next, when the sampling period is changed and the load number LN becomes [5] by the beginning of the new sampling period, during the sound channel AS+2 of the new sampling period, the address 16Vn+LN=16Vn+5 is generated for the parameter ROM 6 based on the voice number Vn stored in the latches 704 and 705 and the current load number LN=[5] by the address generator 502. As a result, the upper 8 bit data consisting of the second decay rate D2R and the release rate RR and the lower 8 bit data consisting of the reference level DL and the key-scaling coefficient KS are read out from the storage area of the tone color data areas which corresponds to the voice number Vn and the relational address is [5]. The second decay rate D2R and the release rate RR are outputted on the TG data bus GEB during the time slot $T_{15}$. During the same time slot $T_{15}$, the second decay rate D2R and the release rate RR are latched in the latch 807 of the RAM access control section 8 at the leading edge timing of the clock $\phi$.

Next, during the time slot $T_3$ of the sound channel AS+3, the TG address $ADR_G=6(i-3)+Ax=6AS+6$ is calculated and outputted based on the relational address Ax=[6] which corresponds to the current load number LN=[5] and on the sound channel number i=AS+3 by the TG address generator 53. The TG address $ADR_G=6AS+6$ is supplied to the common RAM 7 during the first half period of the time slot $T_3$. During the same time slot $T_3$, the second decay rate D2R and the release rate RR held in the latch 807 are written in the storage area of the sound channel data area of the common RAM which corresponds to the sound channel AS and the relational address is [6].

On the other hand, the reference data DL and the key-scaling coefficient KS which are read out from the parameter ROM 6 during the sound channel AS+2, are outputted on the TG data bus GEB during the time slot $T_4$ of the sound channel AS+3, and the output data are latched in the latch 807 of the RAM access control section 8 at the leading edge timing of the clock $\phi$ during the same time slot $T_4$. Next, during the time slot $T_8$ of the sound channel AS+3, the TG address $ADR_G=6(i-3)+Ay=6AS+7$ is calculated and outputted based on the relational address Ay=[7] which corresponds to the current load number LN=[5] and on the sound channel number i=AS+3 by the TG address generator 53. The reference data DL and the key-scaling coefficient KS held in the latch 807 are written in the storage area of the sound channel data area of the common RAM 7 which corresponds to the sound channel AS and the relational address is [7].

As mentioned above, the all parameters which are necessary for the tone generation corresponding to the sound channel AS have been written in the common RAN 7 and the registers of the tone generating section 51. When the load number LN has become [5], the load ending signal END is supplied to the write operation detecting section 9. As a result, the load signal LOAD which is generated during the sound channel AS is changed to "0" by the write operation detecting section and the load mode is thereby ended.

(2b) Sound mode

Figure 16:
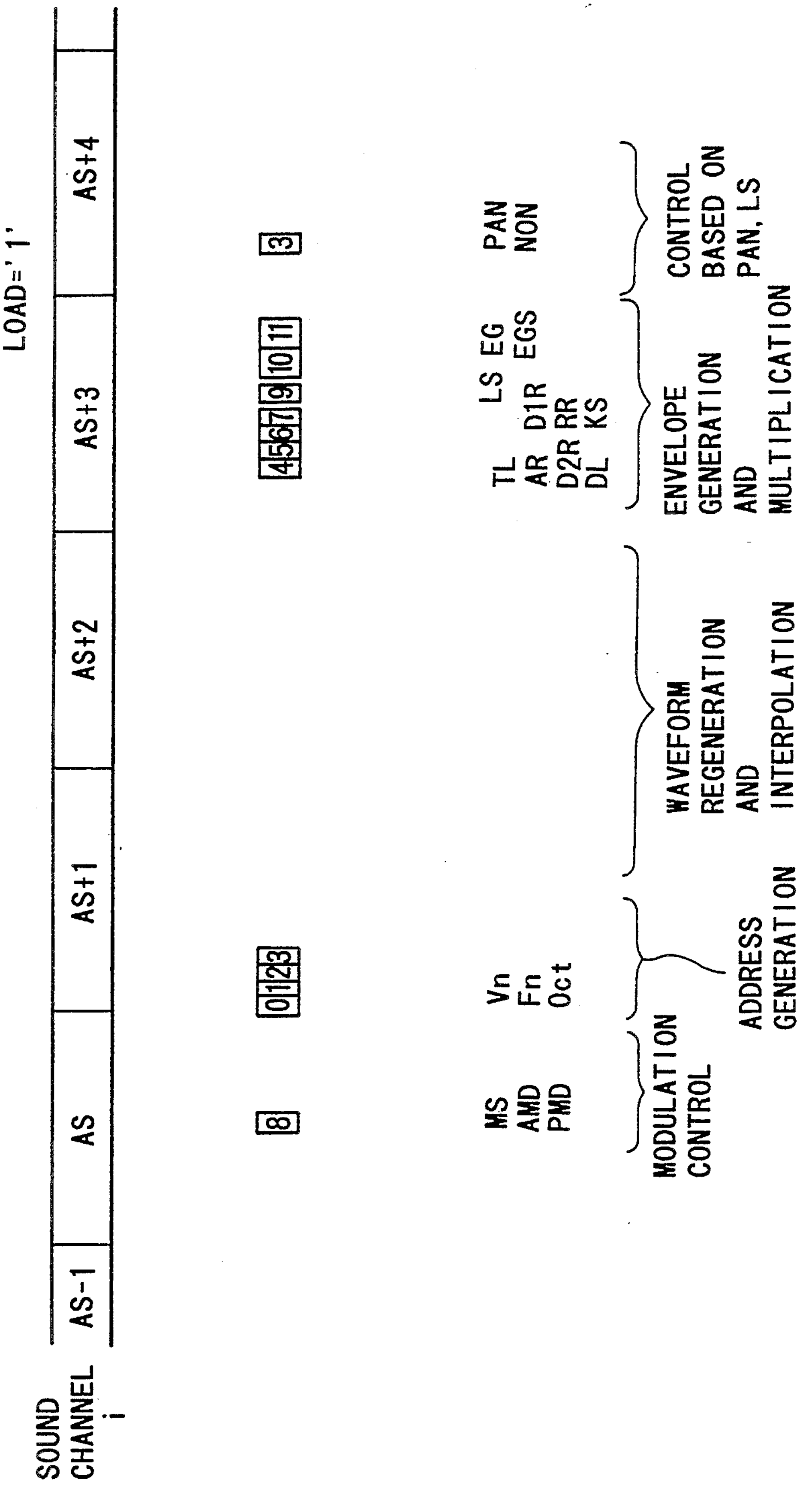

The sound mode begins by the ending of the load mode. FIG. 16 is a time chart showing the operation of the tone generator 5 in the sound mode. Hereinbelow, the operation of the sound mode will be described with reference to FIGS. 13 and 16. In the sound mode, no data is read out from the tone color data area of the parameter ROM 6 and only the waveform sample data are read out from the parameter ROM 6. Furthermore, as the load mode has completed, the all storage areas of the sound channel data area of the common RAM 7 which corresponds to the sound channel AS have been already filled with the data which are necessary for the tone generation corresponding to the sound channel. In the sound mode, the data stored in the sound channel data area are read out and a part of the stored data is sequentially updated for controlling the tone generation.

During the time slot $T_9$ of the sound channel AS, the modulation control data MS, AMD and PMD are read out from the storage area of the sound channel data area of the common RAM 7 which corresponds to the sound channel AS and has the relational address [8] and the read out data are latched in the latches 701 to 703 of the tone generating section 51 during the time slot $T_{10}$. The amplitude modulation data AM and the frequency modulation data PM for the current sampling period are then calculated based on the read out modulation control data by the modulation signal generating section 504. Next, during the time slot $T_{15}$ of the sound channel AS, the lower bit data VnL of the voice number Vn is read out from the storage area of the sound channel data area of the common RAM 7 which corresponds to the sound channel AS and has the relational address [0], and the read out data are then latched in the latch 704 of the tone generating section 51 during the time slot $T_0$ of the sound channel AS+1. Next, during the time slots $T_1$ and $T_2$ of the sound channel AS+1, the lower bit data FnL of the voice number Fn, the upper bit data VnH of the voice number Vn, the octave data Oct and the upper bit data FnH of the F number Fn are sequentially read out from the storage areas of the sound channel data areas of the common RAM 7 which correspond to the sound channel AS and have the relational addresses [1] and [2], and the read out data are then latched in the latches 705 and 706 of the tone generating section 51 during the time slots $T_1$ and $T_2$ of the same sound channel. As a result, the start address SA, the loop start address LS and the loop end address LE are read out from the storage areas of the tone color data areas of the parameter ROM 6 which correspond to the voice number Vn held in the latches 704 and 705, and the read out data are written in the address register section 501. The variation step of the phase data is then calculated based on the F number Fn and the octave data Oct latched in the latches 705 and 706 and the frequency modulation data PMD by the address generator 502, and the calculated result is accumulated to determine the current phase data corresponding to the sound channel AS. Next, the address IA of the waveform data, which is to be read out from the parameter ROM 6, is caluculated based on the phase data, the start address SA, the loop address LS and the loop end address LE by the address generator 502.

Next, during the sound channels AS+1 and AS+2, a predetermined number of the waveform sample data including the waveform sample data corresponding to the address IA are read out from the parameter ROM 6, after which the interpolation calculation is carried out on these waveform sample data by the interpolator 505 by using the interpolation coefficients corresponding to the fractional portion FRAC of the phase data outputted by the address generator 502 to determine the waveform data of the musical tone corresponding to the current sound channel AS.

Next, in the sound channel AS+3, the total level data TL, the attack rate AR, the first decay rate D1R, the second decay rate D2R, the release rate RR, the reference data DL and the key-scaling coefficient KS are read out from the storage areas of the sound channel data area of the common RAM 7 which correspond to the sound channel AS and have the relational addresses [4] to [7] during the time slots $T_4$ to $T_7$, and the read out data are latched in the latches 709 to 715 of the tone generating section 51 during the time slots $T_5$ to $T_8$. Next, the shift data LS, the upper bit data EGH and the lower bit data EGL of the current envelope data and the current state data EGS are read out from the storage areas of the sound channel data area which correspond to the sound channel AS and have the relational addresses [9] to [11] during the time slots $T_{10}$, $T_{12}$ and $T_{13}$, and the read out data are latched in the latches 716, 707 and 708 of the tone generating section 51 during the time slots $T_{11}$, $T_{13}$ and $T_{14}$. The envelope generator 600 starts the calculation of the next state data NXTS and the next envelope data NXTD based on the total level data TL, the attack rate AR, the first decay rate D1R, the second decay rate D2R, the release rate RR, the reference level data DL, the key-scaling coefficient KS, the current envelope data EG (=EGH+EGL) and the current state data EGS held in the latches 707 to 715. Furthermore, the current envelope data EGD and the total level data TL are added by the adder 607 of the envelope generator 600. The waveform data interpolated by the interpolator 505, the amplitude modulation data AM and the output data of the adder 607 of the envelope generator 600 are multiplied by the multiplier 506.

Next, in the sound channel AS+4, the note-on flag NON, the sustain data SUS and the sound image position data PAN are read out from the storage area of the sound channel data area of the common RAM 7 which corresponds to the sound channel AS and has the relational address [3] during the time slot $T_2$. The sound image position data PAN thus read out is latched in the latch 717 of the tone generating section 51 during the time slot $T_3$. The note-on flag NON is supplied to the note-on pulse generator 52. The signal "1" is then generated as the note-on signal NONS corresponding to the sound channel AS by the note-on pulse generator 52 in the case where the note-on flag NON supplied is "1". The sustain data SUS and the note-on signal NONS are supplied to the envelope generator 600. These parameters SUS and NON are used for the calculation of the next state data NXTS and the next envelope data NXTD together with the other parameters. Next, during the time slot $T_9$ of the sound channel AS+4, the output function of the gate 722 is disabled. At this time, the calculation of the next state data NXTS and the next envelope data NXTD by the envelope generator 600 has been completed. The upper bit data of the next envelope data NXTD passes through the gate 722 and is supplied to the data input terminal of the latch 807 of the RAM access control section 8. Next, during the time slot $T_9$, the upper bit data of the next envelope data NXTD is latched in the latch 807 by the leading edge of the clock $\phi$ because the second write control signal GWa is "1". Next, during the time slot $T_{11}$, the TG address $ADR_G=6(i-4)+10=6AS+10$ is caluculated based on the current sound channel number $i=AS+4$ by the TG address generator 53, and the calculated address is supplied to the common RAM 7. During the same time slot, the first write control signal GW is set to "1" by the TG address generator 53. Thus, the upper bit data of the next envelope data NXTD held in the latch 807 is written in the storage area of the sound channel data area of the common RAM 7 which corresponds to the sound channel AS and has the relational address [10].

Next, during the time slot $T_{12}$ of the sound channel AS+4, the output function of the gate 721 is enabled. As a result, the lower bit data of the next envelope data NXTD and the next state data NXTS generated by the envelope generator 600 are supplied to the data input terminal of the latch 807 of the RAM access control section 8. Next, during the time slot $T_{12}$, the lower bit data of the next envelope data NXTD and the next state data NXTS are latched in the latch 807 by the leading edge of the clock $\phi$ because the second write control signal GWa is set to "1". Next, during the time slot $T_{14}$, the TG address $ADR_G=6(i-4)+11=6AS+4$ is calculated based on the current sound channel number $i=AS+4$ by the TG address generator 53, and the calculated address is supplied to the common RAM 7. During the same time slot, the first write control signal GW is set to "1" by the TG address generator 53. Thus, the lower bit data of the next envelope data NXTD and the next state data NXTS held in the latch 807 are written in the storage area of the sound channel data area of the common RAM 7 which corresponds to the sound channel AS and has the relational address [11].

Next, during the sound channel AS+4, the shift operation for the output signal of the multiplier 506 is carried out based on the shift data LS held in the latch 716 by the shift section 507. Next, the output signal of the shift section 507 is distributed for the left and right channels by the PAN control section 508 to obtain the left and right channels signals corresponding to the sound channel AS based on the sound image position data PAN held in the latch 716. The output signals of all sound channels which are outputted by the PAN control section 508 during one samling period are accumulated by the accumulator 509 with respect to the left and right channels, and the accumulated data corresponding to the left and right channels are respectively outputted as the left and right channels digital musical tone signals LOUT and ROUT for the current sampling period.

Thereafter, in every sampling periods, the same operations as the described above are performed. For example, the envelope generation is carried out as follows:

During the sound channel AS+3 of each sampling period, the current envelope data EGD and the current status data EGS corresponding to the sound channel AS are read out from the common RAM 7 and are supplied to the tone generator 5. The next envelope data NXTD and the next state data NXTS are then generated based on the current envelope data EGD and the current state data EGS by the envelope generator 600 of the tone generator 5. The next envelope data NXTD and the next state data NXTS are written in the common RAM 7 during the sound channel AS+4. These data are read out from the common RAM 7 as the current envelope data EGD and the current state data EGS during the next sampling period. In this manner, the common RAM 7 is used as storing means for storing musical tone parameters and the musical tone signal is thereby sequentially generated.

(2c) Damp operation

Next, the damp operation performed by the tone generator 5 will be described. When the key-off event of a key of the keyboard 2 is detected by the CPU 11, the CPU 11 executes the operation of step S2 to write "0" into the note-on flag NON provided in the sound channel data area corresponding to the key-off event. The changing of the note-on flag NON is detected by the note-on pulse generator 52 and the note-on signal NONS corresponding to the sound channel is set to "0". As a result, the next state data NXTS having the value corresponding to the release part R is generated as the next state data of the corresponding sound channel by the new state generator 604 of the envelope generator 600. Thereafter, the release part of the envelope waveform of the sound channel corresponding to the key-off event is generated.

(3) Echo sound generation

When the echo switch provided on the control panel is turned to on-state, "1" is set to the echo flag ECHO in step S3 of the main routine. In this case, when a key of the keyboard 2 is depressed by the performer and the key-on event processing operation routine is executed by the CPU 11, the result of the judgenemt in step S107 is [YES] and the operation of step S108 is thereby executed. In this step S108, the CPU 11 writes a predetermined value WT in the common RAM 7 as the count data CNT(AS) corresponding to the sound channel AS which is determined in step S102 for generating the musical tone corresponding to the key-on event and writes "1" in the common RAM 7 as the echo flag TON(AS) corresponding to the sound channel AS.

When the timer interrupt signal is generated by the timer 12, the CPU 11 executes the timer interrupt routine. In step S201, [0] is set in the control variable i as previously described. Next, in step S202, the echo flag TON(i) corresponding to the sound channel designated by the control variable i is read out from the common RAM 7 and a judgement is made as to whether the content of the echo flag is "0" or not. In the case where the key-depression is performed when the echo flag ECHO is "1", the tone generation corresponding to the key-on event is performed by using a sound channel AS. On the other hand, when a sound channel m is currently used for tone generation, the content of the echo flag TONE(m) corresponding to the sound channel m is "1". Thus, when the control variable i equals to the sound channel number AS of the sound channel which is being used for tone generation, the result of the judgement in step S202 is [NO] whereby the routine proceeds to step S203. Next, in step S203, the count data CNT(i) corresponding to the sound channel i(=m) is read out from the common RAM 7, after which the read out count data is decreased by one and the result is written in the common RAM 7 as the count data CNT(i) corresponding to the sound channel i. Next, in step S204, a judgement is made as to whether the content of the count data CNT(i) becomes [0] by the execution of step S203 or not. When the result of this judgement is [NO], the routine proceeds to step S210. Next, if the control variable i is less than [11], the control variable is increased by one (step S211), after which the routine returns to step S202.

Thereafter, as mentioned above, the content of the count data CNT(m) corresponding to the sound channels which are being used for tone generation are decreased by one every time the timer interrupt routine is executed. When the CPU 11 executes the timer interrupt routine after the count data CNT(m) has become [1], the result of the judgement in step S204 becomes [YES] in the case where i=AS. In this case, the routine proceeds to step S205. In step S205, the echo flags, the value of which are "0", are searched from the all echo flags TON(i) (i=0 to 11) and the sound channels corresponding to the searched echo flags are determined. In the sound channels thus determined, a sound channel through which the envelope data EGD having the lowest value is currently generated is searched and the sound channel number of the searched sound channel is then written as the assigned channel number AS in the common RAM 7. Next, in step S206, the total level data TL is read out from the sound channel data area of the common RAM 7 which corresponds to the sound channel i, after which the read out total level data is multiplied by a predetermined attenuation coefficient D and the multiplied result is written as the total level data TL in the sound chennel data area of the common RAM 7 which corresponds to the sound channel AS. Next, in step S207, the octave data Oct, the F number Fn, the voice number Vn and the sound image position data PAN are read out from the sound channel data area of the common RAM 7 which corresponds to the sound channel i, and the read out data are written in the storage areas of the sound channel data area of the common RAM 7 which correspond to the sound channel AS and the kinds of the read out data. Next, in step S208, "1" is written as the note-on flag NON in the sound channel data area of the common RAM 7 which corresponds to the sound channel AS. As a result, an attenuated musical tone waveform are generated in the sound channel AS which is obtained by attenuating the musical tone waveform which has been generated in the sound channel m based on the attenuation coefficient D. Next, in step S209, the predetermined value WT and "1" are respectively written as the count data CNT(AS) and the echo flag TON(AS) corresponding to the sound channel AS in the common RAM 7 while "0" is written as the echo flag TON(i) corresponding to the sound channel i in the common RAM 7. Next, in step S210, a judgement is made as to whether the control variable i is less than [11] or not. When the result of this judgement is [YES], the control variable i is increased by one (step S211), after which the routine returns to step S202.

Figure 17:
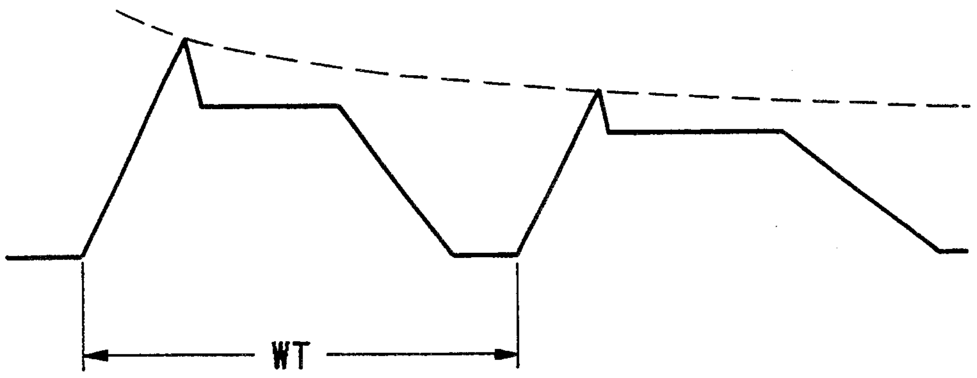
FIG. 17 shows the envelope waveform of an echo sound generated by the electronic musical instrument shown in FIG. 1.

As a result of the processing mentioned above, the echo sounds are generated at a interval corresponding to WT as shown in FIG. 17 and the peak values of the envelopes of the echo sounds are gradually attenuated over time as indicated by the dot line. The attenuation ratio in time between the peak values of the neighbouring envelope waveforms is determined based on the attenuation coefficient D which is used for the operation of step S205 of the timer interrupt routine.

What is claimed is:

1. An electronic musical instrument comprising:

random access memory means, which is addressable for writing thereto and reading therefrom, for storing a plurality of musical tone parameters;

musical tone generating means for generating a musical tone based on the musical tone parameters stored in said memory means, and for writing an updated musical tone parameter into said memory means which indicates the current state of the musical tone being generated by said musical tone generating means; and control means for directing the musical tone generating means to generate a musical tone by writing the musical tone parameters corresponding to the musical tone into said memory means and controlling the tone generation of the musical tone generating means by monitoring the current state of the musical tone based on said at least one musical tone parameter stored in said memory means.

2. An electronic musical instrument according to claim 1 wherein said musical tone generating means has a plurality of tone generation channels, each of which generates a musical tone in synchronization with each of channel timings which constitute a sampling period by which sample data of a musical tone waveform are sequentially generated one by one, and said memory means has a plurality of memory areas, which respectively correspond to the plurality of tone generation channels and each of which stores the plurality of musical tone parameters for controlling the tone generation of the corresponding tone generation channel.

3. An electronic musical instrument according to claim 2 wherein when a plurality of musical tones are generated in a time sharing manner by using the plurality of tone generation channels, the musical tone parameters corresponding to the plurality of tone generation channels are supplied to said musical tone generating means in such a manner that the musical tone parameters corresponding to each of the plurality of tone generation channels are supplied as the musical tone parameters are desired for the control of the tone generation and the musical tone parameters corresponding to different tone generation channels may be supplied during the same tone generation channel timing.

4. An electronic musical instrument comprising:

random access first memory means for storing a plurality of musical tone parameters;

second memory means for storing a control program to thereby control said electronic musical instrument;

control processor means for reading out the control program from said second memory means, controlling said electronic musical instrument based on the read out control program and being capable of performing a reading or writing operation of said musical tone parameters to the first memory means in synchronization with a first time slot;

reading means for reading out said musical tone parameters during a second time slot, the timing of which is different from that of said first time slot; and musical tone generating means for generating a musical tone based on said musical tone parameters read out from said first memory means by said reading means.

5. An electronic musical instrument according to claim 4 wherein said musical tone generating means comprises writing means which writes data representing the current state of the musical tone being generated by the musical tone generating means as a musical tone parameter in said first memory means.

6. An electronic musical instrument according to claim 5 wherein said control processor means reads out said musical tone parameter which indicates the current state of the musical tone from said first memory means and controls said musical tone generating means based on the read out musical tone parameter.

7. An electronic musical instrument according to claim 4 wherein said musical tone generating means comprises waveform memory means for storing waveform data which is obtained by sampling musical tone waveforms, and the tone generating means reads out the waveform data from said waveform memory means based on the plurality of musical tone parameters read out by said read out means to generate a musical tone.

8. An electronic musical instrument comprising:

random access memory means having a plurality of memory areas each of which stores musical tone parameters corresponding to a musical tone to be generated;

musical tone generating means having a plurality of tone generation channels, respectively corresponding to the plurality of memory areas, each of which generates a musical tone based on the musical tone parameters stored in the corresponding memory area, each of the plurality of tone generation channels writing the current state of a musical tone being generated thereby as a musical tone parameter in the corresponding memory area; and control means for monitoring the current states of the musical tones generated by said plurality of tone generation channels based on the musical tone parameters stored in the memory areas of said memory means, wherein the control means, in response to a tone generation designation, selects one of the plurality of tone generation channels based on the current states and writes a musical tone parameter corresponding to the tone generation designation into a memory area corresponding to the selected tone generation channel so as to generate a desired musical tone.

9. An electronic musical instrument according to claim 8 wherein said control means monitors the current levels of the generated musical tones based on the musical tone parameters stored in the memory areas of said memory means.

10. An electronic musical instrument comprising:

memory means having a plurality of memory areas each of which stores musical tone parameters;

musical tone generating means having a plurality of tone generation channels each of which generates a musical tone based on the musical tone parameters stored in the memory areas corresponding thereto; and control means for selecting one of the plurality of tone generation channels in response to a tone generation designation and for writing the musical tone parameters, which correspond to a musical tone to be generated, in one of the plurality of memory areas corresponding to the selected tone generation channel, wherein said control means, when at least two musical tones having the same musical tone parameters are to be generated in series, writes the musical tone parameters into a memory area in said memory means to generate the first musical tone, and after a predetermined time, copies the musical tone parameters in said memory area to another memory area in said memory means to be used to generate a subsequent musical tone.

11. An electronic musical instrument according to claim 10, wherein each of the plurality of tone generation channels writes data representing the current state of the musical tone being generated thereby in the corresponding memory area, and said control means selects one of the plurality of tone generation channels based on the data representing the current state.

12. An electronic musical instrument according to claim 10 wherein said control means further updates a portion of the read out musical tone parameters so as to attenuate the level of the generated musical tone.

* * * * *